(12) United States Patent
Sedan et al.

(10) Patent No.: US 8,935,336 B2
(45) Date of Patent: Jan. 13, 2015

(54) OPTIMIZING PROGRAM REQUESTS OVER A WIDE AREA NETWORK

(75) Inventors: Boaz Sedan, Zikhron Yaaqov (IL); Moshe Yosevshvili, Kiryat Bialik (IL); Etai Lev Ran, Sunnyvale, CA (US); Daniel Kaminsky, Sunnyvale, CA (US); Israel Ben-Shaul, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 903 days.

(21) Appl. No.: 12/141,774

(22) Filed: Jun. 18, 2008

(65) Prior Publication Data

US 2009/0319600 A1 Dec. 24, 2009

(51) Int. Cl.
*G06F 15/16* (2006.01)
*G06F 11/07* (2006.01)

(52) U.S. Cl.
CPC ........ *G06F 11/0766* (2013.01); *G06F 11/0709* (2013.01)
USPC ........... 709/206; 709/202; 709/219; 709/224; 709/228; 709/234

(58) Field of Classification Search
USPC .................. 709/206, 202, 219, 224, 228, 234
See application file for complete search history.

(56) References Cited

U.S. PATENT DOCUMENTS

| | | | | |
|---|---|---|---|---|
| 5,131,085 A * | 7/1992 | Eikill et al. | ................... | 710/110 |
| 6,430,602 B1 * | 8/2002 | Kay et al. | ....................... | 709/206 |
| 6,460,080 B1 * | 10/2002 | Shah et al. | ..................... | 709/224 |
| 6,505,236 B1 * | 1/2003 | Pollack | ......................... | 709/206 |
| 6,598,076 B1 * | 7/2003 | Chang et al. | ................... | 709/206 |
| 7,761,536 B2 * | 7/2010 | Subramanian et al. | ........ | 709/219 |
| 8,170,061 B2 * | 5/2012 | Abe et al. | ....................... | 370/474 |
| 8,817,308 B2 * | 8/2014 | Tonegawa | ..................... | 358/1.15 |
| 2003/0084106 A1 * | 5/2003 | Erev et al. | ...................... | 709/206 |
| 2004/0019655 A1 * | 1/2004 | Uemura et al. | ................ | 709/217 |
| 2005/0086306 A1 * | 4/2005 | Lemke | .......................... | 709/206 |
| 2005/0198288 A1 * | 9/2005 | Elfner | ............................ | 709/225 |
| 2006/0212524 A1 * | 9/2006 | Wu et al. | ........................ | 709/206 |
| 2006/0271697 A1 * | 11/2006 | Kruse et al. | .................... | 709/230 |
| 2006/0277383 A1 * | 12/2006 | Hayden et al. | ................ | 711/170 |

(Continued)

OTHER PUBLICATIONS

Unknown Author; Server Message Block (SMB) Protocol specification; Microsoft Corporation; 326 Pages.*

(Continued)

*Primary Examiner* — Krista Zele
*Assistant Examiner* — Anthony Fabbri
(74) *Attorney, Agent, or Firm* — Hickman Palermo Truong Becker Bingham Wong LLP

(57) ABSTRACT

In various embodiments, data processing apparatus, software, or machine-implemented methods can optimize NFSv3 asynchronous write requests or MSRPC calls that traverse a wide area network, for example, by receiving, from a client, a first request directed to a server across a wide area network; determining whether a related second request has been received previously; when a related second request has been received previously, sending, to the client, a first reply to the second request and forwarding the first request to the server, and otherwise forwarding the first request to the server without sending any reply to the client for the first request. Sending local replies from a WAN optimizer induces the client to send continuous requests, improving throughput, but at least one client request remains unreplied to, and one server error reply is always reported to the client, facilitating correct error processing at the client.

21 Claims, 19 Drawing Sheets

(56) References Cited

U.S. PATENT DOCUMENTS

| | | | |
|---|---|---|---|
| 2009/0019157 A1* | 1/2009 | Suman et al. | 709/225 |
| 2010/0070770 A1* | 3/2010 | Flores | 713/176 |

OTHER PUBLICATIONS

B. Callaghan et al.; RFC 1813—NFS Version 3 Protocol Specification; Jun. 1995; Sun Microsystems, Inc.; ; 96 Pages.*

Stefan Savage et al.; "TCP Congestion Control with a Misbehaving Receiver" ; Oct. 19, 1999; University of Washington, Seattle; 8 Pages.*

Rob Sherwood et al., "Misbehaving TCP Receivers can cause Internet-Wide Congestion Collapse"; Nov. 11, 2005; ACM; UofMaryland; 10 Pages.*

Callaghan, et al., NFS Version 3 Protocol Specification, Published by Network Working Group [online]. Jun. 1995 [retrieved on Oct. 14, 2008]. pp. 1-118. Retrieved on the Internet: <URL: http://www.ietf.org/rfc/rfc1813.txt>.

Anonymous. Cisco Wide Area Application Services (WAAS) V4.0 Technical Overview. Published by Cisco [online]. 2008 [retrieved on Oct. 14, 2008]. pp. 1-10. Retrieved from the Internet: <URL:http://www.cisco.com/en/US/prod/collateral/contnetw/ps5680/ps6870/prod_white_paper0900aecd8051d5b2_ns739_Networking_Solutions_White_Paper.html>.

Anonymous. XDR: External Data Representation Standard. Sun Microsystems, Inc. Published by Network Working Group [online]. Jun. 1987 [retrieved on Oct. 15, 2008]. pp. 1-19. Retrieved form the Internet: <URL:http://tools.ietf.org/rfc/rfc1014.txt>.

Shepler, S., et al. NFS version 4 Protocol. Sun Microsystems, Inc. Published by Network Working Group [online]. Dec. 2000 [retrieved on Oct. 15, 2008]. pp. 1-209. Retrieved form the Internet: <URL:http://tools.ietf.org/html/rfc3010>.

Anonymous. RPC: Remote Procedure Call Protocol Specification Version 2. Sun Microsystems, Inc. Published by Network Working Group [online]. Jun. 1988 [retrieved on Oct. 15, 2008]. pp. 1-24. Retrieved from the Internet<URL: http://www.ietf.org/rfc/rfc1057.txt>.

Anonymous. NFS: Network File System Protocol Specification. Sun Microsystems, Inc. Published by Network Working Group [online]. Mar. 1989 [retrieved on Oct. 15, 2008]. pp. 1-22. Retrieved from the Internet<URL:http://www.faqs.org/rfcs/rfc1094.html>.

* cited by examiner

| cd nfsv3 | |
|---|---|
| | ASyncWriteHandler |
| | − pendingWritesDB: WritesDB<br>− replyBuffer: char[256]<br>− nfs: NFSvEdgeService* |
| | + HandleCall(rpcCallInfo :const RpcCallInfo &, userInfo :const IRpcAuth &, buf :RpcBuffer &) : RPC_ACTION<br>+ OnPassThroughComplete(rpc :IRpc*, status :RPC_STATUS, cookie :const WriteCookie &) : void<br>+ OnReplyComplete(rpc :IRpc*,xid :uint32, status :uint32) : void<br>+ OnReplyAvailable(buf: RpcBuffer &, replyInfo :RpcReplyInfo &, cookie :const WriteCookie &) : RPC_ACTION<br>+ OnDropComplete(rpc :IRpc*, status:RPC_STATUS) : void |

FIG. 3G

OPTIMIZING PROGRAM REQUESTS OVER A WIDE AREA NETWORK

TECHNICAL FIELD

The present disclosure generally relates to data processing. The disclosure relates more specifically to performing data transfer operations over wide area networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network File System protocol (NFS) is a network communications protocol that enables data files stored in a file server accessible to any computer that is coupled to a network. NFS version 3 is defined in Request for Comments (RFC) 1813.

NFS can be implemented in a wide area network (WAN) environment in which client computers are physically separated from file servers by long distances. WAN environments may be characterized by high latency, meaning that clients experience noticeable delays in waiting for server responses after sending data. To address the high latency in WAN environments, some clients use asynchronous WRITE operations under NFS. However, when the clients also expect to transfer data at high rates of throughput, inherent aspects of NFS may cause undesirable delays in completing data transfer operations. For example, the data buffer sizes allowed in NFS for asynchronous WRITE operations, typically 32 kilobytes (Kb), are too small to accomplish high throughput data transfers and require clients to break up a single large data transfer operation into multiple smaller operations, which increases processing overhead at the client and increases the number of requests and replies that must traverse the WAN. It has been observed that LINUX implementations typically use a buffer size of 512 KB and SOLARIS clients use 128 KB for write. Thus the clients limit the amount of data traversing to the server, also limiting the effective throughput to (data-in-the-air) per round trip; the limit may be as little as 6 MB/sec on a T1/80 connection with a 512 KB buffer or 1.5 MB/sec with 128 KB in-the-air. If the client is attempting to perform a copy operation for a large file, this performance is poor.

CIFS optimization approaches address a similar problem, but typically rely upon OPEN operations and CLOSE operations for error reporting. This approach is not entirely reliable because few CIFS applications are programmed to check for errors as part of a CLOSE operation.

BRIEF DESCRIPTION OF THE DRAWINGS

In the drawings:

FIG. 3G illustrates members of the ASyncWriteHandler class, in one embodiment;

DETAILED DESCRIPTION

Figure 1:
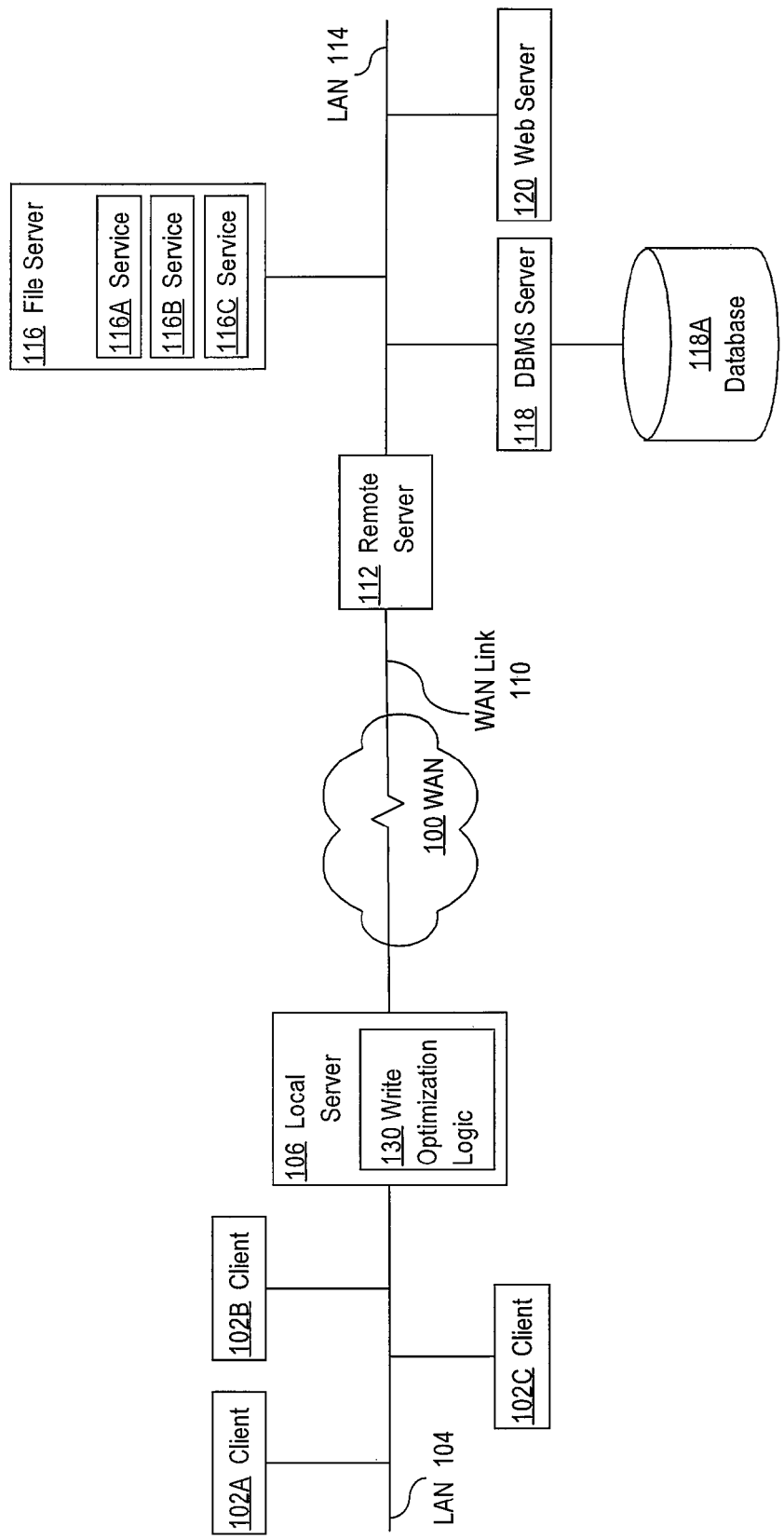
FIG. 1 illustrates an example of a wide area network environment in which an embodiment may be used.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
    3.0 Example NFSv3 Implementation in Wide Area Access Service
    4.0 MSRPC Embodiments
    5.0 Implementation Mechanisms—Hardware Overview
    4.0 Extensions and Alternatives
    1.0 General Overview In various embodiments, data processing apparatus, software, or machine-implemented methods can optimize NFSv3 asynchronous write requests or MSRPC calls that traverse a wide area network, for example, by receiving, from a client, a first request directed to a server across a wide area network; determining whether a related second request has been received previously; when a related second request has been received previously, sending, to the client, a first reply to the second request and forwarding the first request to the server, and otherwise forwarding the first request to the server without sending any reply to the client for the first request. Sending local replies from a WAN optimizer induces the client to send continuous requests, improving throughput, but at least one client request remains unreplied to, and one server error reply is always reported to the client, facilitating correct error processing at the client.

In an embodiment, a data processing apparatus, comprises a network interface; a processor coupled to the network interface; a machine-readable volatile or non-volatile storage medium coupled to the processor and storing one or more sequences of instructions which, when executed by the processor, cause the processor to perform: receiving, from a client, a first request directed to a server across a wide area network; determining whether a related second request has been received previously; when a related second request has been received previously, sending, to the client, a first reply to the second request and forwarding the first request to the server, and otherwise forwarding the first request to the server without sending any reply to the client for the first request.

In an embodiment, the first request is to write data for a specified file handle on the server and for a specified user, and the second request is to write data for the same file handle and user.

In an embodiment, the apparatus further comprises sequences of instructions which, when executed by the processor, cause the processor to perform receiving, from the server, a second reply to a third request to write data for a second specified file handle and a second specified user; determining whether the client has been given a second reply to the third request previously; forwarding the second reply to the client when the client has not been given a second reply to the third request previously, and otherwise discarding the second reply.

In an embodiment, each request and reply conforms to Network File System protocol version 3 (NFSv3). In an embodiment, each request is an NFSv3 request having an UNSTABLE value set.

In an embodiment, the apparatus further comprises sequences of instructions which, when executed by the processor, cause the processor to perform receiving, from the server, a second reply to a third request to write a second specified file handle and a second specified user; determining whether the client has been given a second reply to the third request previously; when the client has not been given a second reply to the third request previously, forwarding the second reply to the client including any error code of the server that is in the second reply, and otherwise discarding the second reply.

In an embodiment, the apparatus further comprises sequences of instructions which, when executed by the processor, cause the processor to perform: in response to receiving multiple replies from the server for a plurality of client requests that have been forwarded to the server wherein each of the replies comprises a different server error code, sending to the client the most recently received reply with any server error code in that reply.

In an embodiment, the first request is a first fragment of a remote procedure call that conforms to MSRPC, and the second request is a second fragment of the same remote procedure call.

In an embodiment, the apparatus further comprises receiving from a transport protocol a delivery failure message specifying a failure to deliver one or more of the first fragment and the second fragment, and sending the delivery failure message to the client in response to receiving a last fragment from the client.

In an embodiment, the apparatus comprises a wide area access service edge node that is configured to couple to the client and to a wide area network that includes the server.

In other embodiments, the invention encompasses a machine-implemented method and a machine-readable medium configured to carry out the foregoing steps.

2.0 Structural and Functional Overview

In various embodiments, approaches are provided for optimizing NFS Asynchronous Write operations in a wide area network (WAN) environment, while maintaining good performance and reliability. Embodiments are applicable to protocols other than NFS, such as Microsoft Remote Procedure Call (MSRPC). Embodiments may be implemented in general-purpose computers or network elements that are typically positioned at an edge of a WAN. For example, an embodiment may be achieved by modifications and enhancements, as described herein, to a Cisco Wide Area Access Service (WAAS) device, from Cisco Systems, Inc., San Jose, Calif.

NFS embodiments may include logic that implements NFS version 3, as defined in RFC1813 published by the Internet Engineering Task Force (IETF) in June 1995, the entire contents of which are hereby incorporated by reference for all purposes as if originally set forth herein. NFS operations are performed over a Remote Procedure Call (RPC) mechanism. An NFS protocol client sends data write requests to a server using data chunks of limited size, such as 32 Kb. The client sends several requests and then waits for a reply from the server. The reply may indicate success or failure. The client then continues sending more requests. In an embodiment, optimization logic automatically generates and sends local replies to requests using a local optimization device that intercepts LAN traffic, before the traffic reaches a remote server across a WAN. This approach induces the client to generate a continuous stream of requests instead of waiting for replies from the remote server. Each of the local replies must report success, while the server might generate an error for the requests. In an embodiment, the last request received from a client for a particular server file handle is unanswered locally but sent to the real server.

In one embodiment, when a client asynchronous write request arrives, at a local optimization device, to write to a specific file handle, the request is forwarded by the device to the remote server. When another request to write to the same file handle arrives, a local success reply is sent to the previous request, and the newly received request is again forwarded to the remote server. As a result, N requests have been sent to the remote server, but N−1 local responses are issued. When a reply arrives from the remote server, the logic tests whether the reply is for a request that was already answered locally. If so, the reply is dropped; otherwise, the reply is forwarded to the client.

In this approach, one response is forwarded from the real server to the client. Consequently, the approach guarantees that the file server always will receive and respond to one request, but the approach also maintains a continuous stream of requests from the client to the server by providing local answers to requests. Accordingly, the reliability of a set of write operations for a file handle is assured because the approach always delivers server messages for failed write operations, while data throughput is maximized. In contrast, an approach that did not allow the file server to answer at least one of the requests would not guarantee reliability. The present approach optimizes performance because only the minimal required number of requests is forwarded and processed by the real server.

FIG. 1 is a block diagram that illustrates an overview of a system in which an embodiment may be implemented.

Local Area Network (LAN) 104 is communicatively connected to LAN 114 over Wide Area Network (WAN) 100.

One or more clients, such as clients 102A, 102B, and 102C are communicatively connected over LAN 104 to local server 106. Local server 106 provides access to WAN 100 for one or more clients on LAN 104. Local server 106 is also communicatively connected, over WAN 100, to remote server 112 via a WAN link 110.

Remote server 112 is communicatively connected over LAN 114 to one or more servers, such as file server 116, Database Management System (DBMS) server 118, and web server 120. File server 116 provides one or more services, which may comprise filesystem services, application services, which are represented by services 116A, 116B, and 116C.

Local server 106 comprises write optimization logic 130, which is operable when executed to perform the asynchronous write optimization functions that are described further herein. In various embodiments, the write optimization logic 130 may be implemented using one or more computer programs or other software elements, hardware logic such as one or more ASICs, firmware, or a combination thereof.

In general, in operation, local server 106 intercepts each data write request, under NFS, MSRPC, or other protocols, from a client on the local LAN 104, such as, for example, client 102A. The intercepted request is to perform an asynchronous write of a specified file in a file server or for execution of an operation on a service established on the remote LAN 114, such as, for example, service 116A. Local server 106 is configured to forward client requests to the remote server 112, over the WAN link 110, as further described herein. Local server 106 is also configured to forward to the client responses that are received from remote server 112 as described herein.

To illustrate a clear example, local server 106 is illustrated in the position of an edge node of a wide area network environment. However, local server 106 may be positioned elsewhere in the environment. Local server 106 may comprise an optimizer node of any kind implemented in a router, switch, general purpose computer, or other data processing unit.

Embodiments of the techniques described herein may be implemented in operational contexts and/or in systems that are different than the operational context and the system depicted in FIG. 1. For example, in one embodiment, a client may perform the steps performed by the local server described above. In this embodiment, the client may be connected to the remote server over a dial-up connection, DSL, an ISDN line, or any other type of slow or relatively slow communication link. Further, the local server 106 may be eliminated. In addition, one or more servers on the remote LAN may provide DBMS services, web services, or any other services that support the execution of file operations.

In various embodiments, local server 106 may implement other applications and services associated with WAN optimization, such as local data caching, RPC optimization, etc. Thus, write optimization logic 130 may form one unit in a system of optimization services that are hosted at local server 106.

Figure 2B:
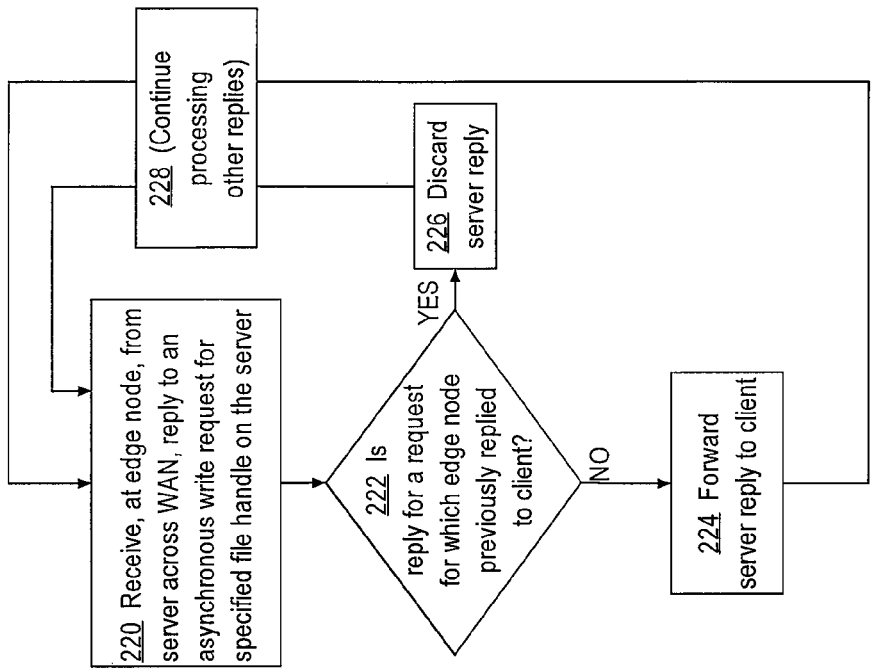
FIG. 2B illustrates processing server replies to asynchronous write requests of clients at an edge node of a wide area network.
Figure 2A:
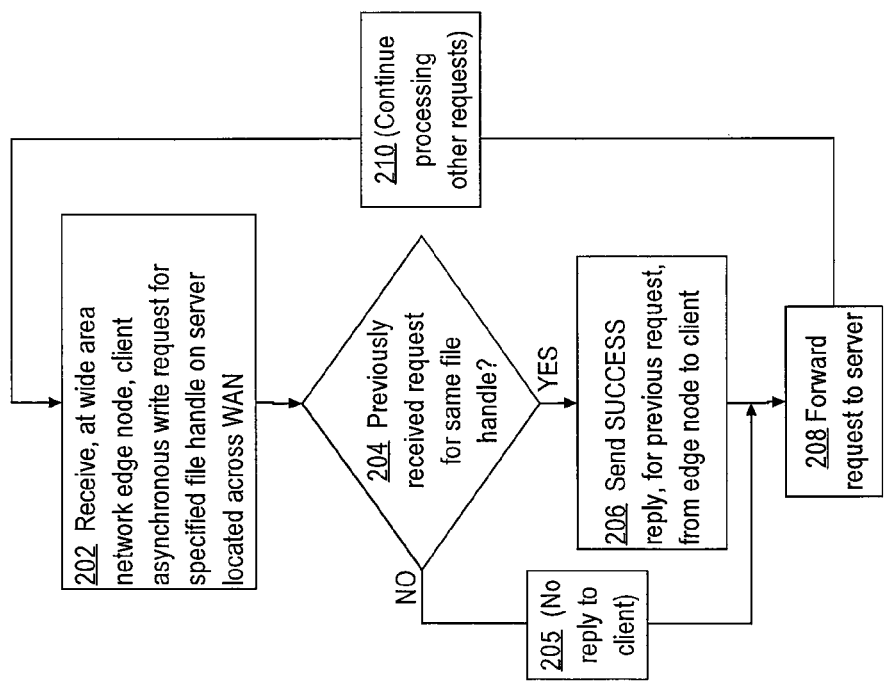
FIG. 2A illustrates a processing asynchronous write requests of clients at an edge node of a wide area network.

FIG. 2A illustrates a processing asynchronous write requests of clients at an edge node of a wide area network; FIG. 2B illustrates processing server replies to asynchronous write requests of clients at an edge node of a wide area network. The steps of FIG. 2A, FIG. 2B may be implemented, for example, in the write optimization logic 130 of local server 106 of FIG. 1. Thus, FIG. 2A and FIG. 2B represent approaches for processing client asynchronous write requests and server replies at a wide area edge node, or other optimizer node in a network that is logically interposed between a client and a server.

Referring first to FIG. 2A, in one embodiment, at step 202 a request from a client is received at the network node. In one embodiment, the network node is a wide area access device, wide area network edge node, or other optimizer node. The request is to perform an asynchronous write operation for a file stored in or associated with a remote server and having a file handle that is specified in the request. In an embodiment, the file handle is also associated with a user identifier of a user of the client, and the file handle and user are bound as a pair of values that are tracked in succeeding steps.

In an embodiment, step 202 also comprises incrementing a counter that counts the number of write calls pending for a particular file handle-user pair. The counter is incremented during a write call and decremented during reply processing.

In an embodiment, the request is an NFS write request. In an embodiment, the request is an NFS Version 3 UNSTABLE type write request. Alternatively, the request is an MSRPC request. NFS Version 3 introduces the concept of "safe asynchronous writes." A Version 3 client can specify that the server is allowed to reply before it has saved the requested data to disk, permitting the server to gather small NFS write operations into a single efficient disk write operation. A Version 3 client can also specify that the data must be written to disk before the server replies, just like a Version 2 write. The client specifies the type of write by setting the stable_how field in the arguments of each write operation to UNSTABLE to request a safe asynchronous write, and FILE_SYNC for an NFS Version 2 style write.

Servers indicate whether the requested data is permanently stored by setting a corresponding field in the response to each NFS write operation. A server can respond to an UNSTABLE write request with an UNSTABLE reply or a FILE_SYNC reply, depending on whether or not the requested data resides on permanent storage yet. An NFS protocol-compliant server must respond to a FILE_SYNC request only with a FILE_SYNC reply.

Clients ensure that data that was written using a safe asynchronous write has been written onto permanent storage using a new operation available in Version 3 called a COMMIT. Servers do not send a response to a COMMIT operation until all data specified in the request has been written to permanent storage. NFS Version 3 clients must protect buffered data that has been written using a safe asynchronous write but not yet committed. If a server reboots before a client has sent an appropriate COMMIT, the server can reply to the eventual COMMIT request in a way that forces the client to resend the original write operation. Version 3 clients use COMMIT operations when flushing safe asynchronous writes to the server during a close (2) or fsync (2) system call, or when encountering memory pressure.

In step 204, the process tests whether another request was previously received to write the same file handle for the same user. If not, then no local reply is sent to the client, as stated in step 205, and the present client write request is forwarded to the server at step 208.

If another request to write the same file handle for the same user was previously received, then in step 206 a SUCCESS reply, for the previously received write request, is sent from the network node to the client. The client's current request is then forwarded to the server at step 208. Thus, only a previously received write request is locally replied to in the process and at least one current client write request for a particular file handle and user pair always remains not replied to.

At step 210 the node continues processing other requests from the client, or from other clients.

Referring now to FIG. 2B, at step 220 the edge node receives, from the server across the WAN, a server reply to an asynchronous write request for a specified file handle and user on the server. The reply is for a client request that the node previously forwarded to the server.

In step 222, the process tests whether the server reply is for a client request for which the node previously sent a local reply to the client—that is, a request for which the node had previously sent a SUCCESS reply at step 206 of FIG. 2A. If so, then at step 226 the server reply is discarded or dropped and the client is not informed; processing continues with other server replies as they arrive, as indicated in step 228.

However, if the node had not previously sent a local reply for the request associated with the server reply, then in step 224 the server reply is forwarded to the client.

In an embodiment, the server reply is inspected to determine if an error code is indicated. If the server reply contains an error indication, then in an embodiment, the process of FIG. 2A and FIG. 2B is modified. In the modification, for all requests that are received in FIG. 2A for the same file handle and user after the server error reply was received, a local reply is generated and sent to the client containing the server error indication.

In an alternative embodiment, each request and reply conforms to MSRPC, and each request specifies writing a fragment, which is the basic unit for data write requests under MSRPC. In one approach, each reply includes a fragment header comprising one or more MSRPC identification values that associate the reply with a corresponding request. Further information about MSRPC embodiments is provided in section 4.0.

3.0 Example NFSv3 Implementation in Wide Area Access Service

In an embodiment, the general approach described herein is implemented in a wide area network environment edge node, such as a Wide Area Access Service (WAAS) node.

3.1 Design Overview

In one embodiment, NFS is implemented in an XNFS protocol suite, comprising Port-Mapper, Mount, NFS and NLM/NSM protocols. NFS operates on top of ONCRPC, also known as Sun RPC protocol, which is described in RFC 1057, and uses XDR as described in RFC 1014 for encoding and decoding. In an embodiment, NFSv3 is used, but alternative embodiments may be used with NFSv2 as defined in RFC 1094 or NFSv4 as defined in RFC 3010.

Figure 3A:
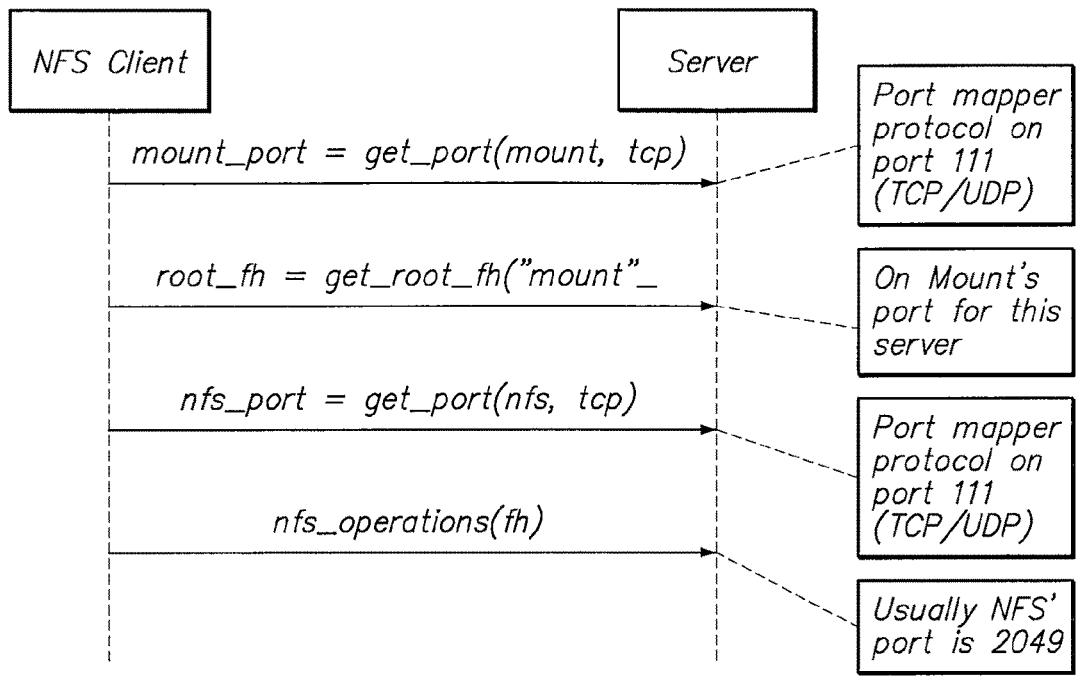
FIG. 3A illustrates a sequence of operations under XNFS.

FIG. 3A illustrates a sequence of operations under XNFS. An NFS Client that wishes to work with a file-server, connects to the port-mapper service on the file-server (fixed port 111 for both TCP and UDP) asking for a Mount port on that server (for a specific version of the Mount protocol). The port-mapper replies with the port number for Mount and the client then connects to the Mount service, requesting the file-handle for the mount's root. This file-handle will be used as the initial start point for the tree traversing that will take place in NFS. Next, the client asks the port-mapper for the port of the NFS service (specific version of NFS). Having the NFS port (default is 2049) and root's file-handle, the client can start using NFS for traversing the tree and manipulating various files. NLM and NSM also obtain a port from the port-mapper.

NFS versions 2 and 3 are stateless in nature; in each NFS packet, all relevant data is present for both NFS and RPC, and the file-server does not manage a context data structure or session. For example, user identification is sent in each packet; a client authentication approach is not used. Consequently, NFS clients, rather than servers, implement logic to address extreme cases or error conditions. Because NFS runs over ONCRPC, which operates over both TCP and UDP, NFS clients are expected to implement logic for issues related to UDP, such as retransmissions. XDR is used for encoding/decoding for both ONCRPC and NFS protocols but is not considered a protocol but rather a standard for data representation.

NFS implementations do not require a particular type of operating system, network architecture, or transport protocols. NFS supports a hierarchical file-system comprising named directories that group related files and directories. Each file or directory has a string name that is unique within the directory. A file-system is a tree on a single server with specified "root". UNIX operating systems provide a mount operation to make all file-systems appear as a single tree, while DOS, Windows and Windows NT assign file-systems to disk letters or top-level names (newer versions of Windows also allow mount operations).

An NFS file handle is a reference to a file or directory that is independent of the file name. All NFS operations use a file handle to identify the file/directory to which operation applies. An NFS file handle is opaque to the client. A server creates file handles and only the server can interpret the data contained within them.

In a wide area access service, each optimizer node can optimize operation of several different protocols and different message types within each protocol. In an embodiment, in NFS optimization is potentially possible for Meta-Data (MD) requests (e.g. GETATTR); Data Requests (e.g. READ and WRITE); and Directory Listing (e.g. LOOKUP). Certain NFSv3 clients implement logic that attempts to optimize these aspects. However, presently known clients do not appear to effectively optimize high latency high throughput network operations. Typically, clients may try to perform efficient asynchronous WRITE operations, but the buffer sizes used are far too small to be optimal for high latency high throughput environments.

In an embodiment, reliability aspects of NFSv3 support the reply approach disclosed herein. For example, a client can store data on a server, and through the reply, or through a COMMIT phase, guarantee that the data has actually been written to permanent storage. The client is responsible to keep any un-flushed data locally, until the server guarantees its storage. Consequently, the approach herein can rely on the client for error handling when the process returns a server reply indicating a write error for any of the requests associated with a file handle. An optimizer node or other element that implements the approach herein does not need to provide error handling.

In an embodiment, logic in an optimizer node is configured to optimize NFS write requests that have the 'UNSTABLE' flag set, which indicates that the client is requesting to perform a high performance write operation, and is prepared to handle errors of an asynchronous write operation. STABLE writes are only performed when an application specifically asks for stable semantics in the open command. In an embodiment, a new write reply verifier is generated per connection, so that the client will be aware of any failure in the optimizer node, and can retransmit the data, similar to the client's behavior in the case of a server failure.

When a write request arrives for a file handle, two situations are possible. First, there may be no other write request previously sent for a particular File-Handle/User pair associated with the write request that just arrived. Second, there may be another write request in-the-air for the File-Handle/User pair. In the first case, the write request is passed on through to the server. When a reply arrives, it is sent to the client.

Figure 3B:
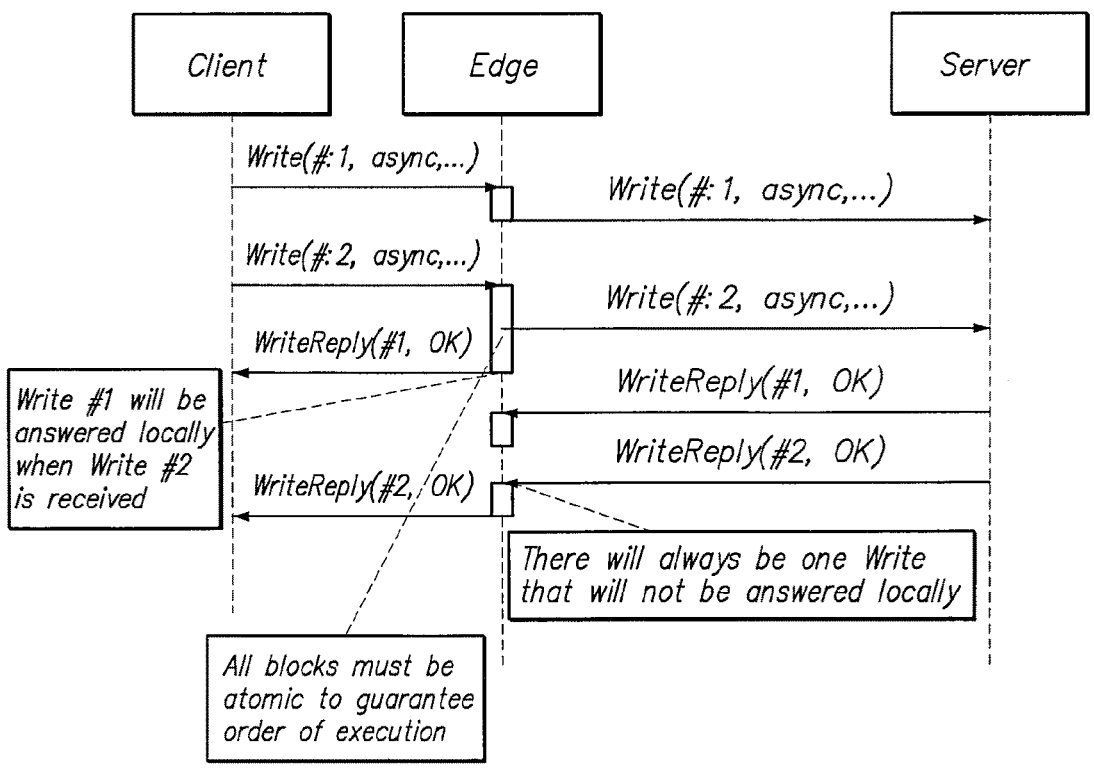
FIG. 3B illustrates processing a received write request for a file handle.

In the second case, a local reply message is sent to the client for the previous write request, and the new write request is forwarded to the server. If a successful write reply arrives from the server from the previous write request, the reply is discarded (a local reply has already been sent), otherwise (in the case of an error), the error reply will be sent to the client (appearing to arrive on the second write request). FIG. 3B illustrates processing a received write request for a file handle using these approaches.

Figure 3C:
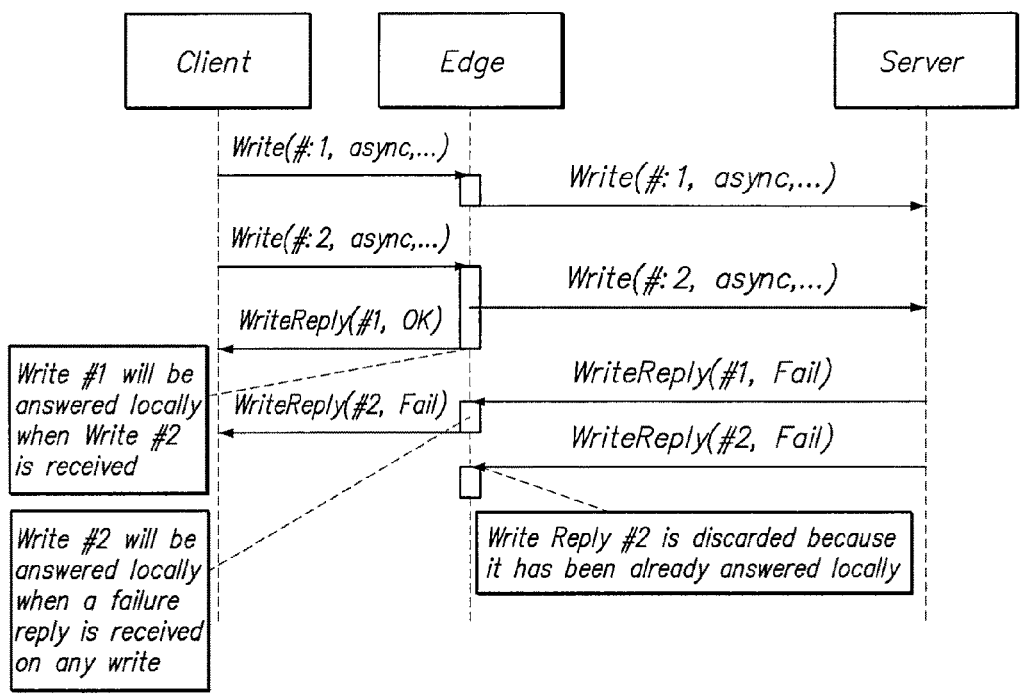
FIG. 3C illustrates messages that are transmitted in an asynchronous WRITE when a server error occurs.

As a result, common problems when optimizing data write. For example, NFS applications are inherently bound to receive error replies late because of the semantics and order of NFS asynchronous messages. The present approach guarantees that error replies are reported. Further, the approach herein causes the client to transmit data at full speed, and the client always receives error notifications from the server on write operations. FIG. 3C illustrates messages that are transmitted in an asynchronous WRITE when a server error occurs.

In an embodiment, WCC codes as identified in RFC 1813 are supported. In general, NFSv3 write replies should include a WCC code, which includes time stamp information for the file that is written, including a timestamp prior to writing and a timestamp after writing. Correct WCC codes can only be generated at the file server. In an embodiment, since the last write reply is always forwarded from the server to the client, and not generated locally at the optimizer node, the approach herein guarantees that the last WCC code forwarded to the client is a correct WCC code. Therefore, in an embodiment fake WCC codes can be generated without causing the client to lose synchronization with the server, because the last client update is the real code from the server. In one embodiment, the fake WCC codes are generated by approximately synchronizing the file server time with the clock of the optimizer node whenever a write reply from the server is received at the optimizer node, and WCC codes are generated based on the updated synchronized time. In another embodiment, a time stamp in monotonically incremented by the smallest possible value on every write operation.

3.2 Design Details—Write Optimizations

In an embodiment, under NFSv3 each client write request or call has a "stable_how" field that can carry the value UNSTABLE, DATA_SYNC, or FILE_SYNC. A value of UNSTABLE value this means that the server is free to commit any part of the data and metadata to stable storage, including all on none, before returning a reply to the client. The server provides no guarantee whether or when any un-committed data will subsequently be committed to stable storage. The only guarantees of the server are that the server will not destroy any data without changing the value of the verf (verification field in write reply) and that it will not commit the data and metadata at a level lower than that requested by the client. UNSTABLE write calls are sometimes referred to as asynchronous write requests.

A value of DATA_SYNC means that the server must commit all data to reliable storage and enough of the metadata to retrieve the data before returning. A value of FILE_SYNC means that the server must commit the data written plus all file system metadata to stable storage before returning.

In an embodiment, write optimization logic 130 is configured to optimize UNSTABLE write calls and to forward other types of stable_how calls to the server as-is; relies to the other types of calls also are forwarded unchanged to the client.

In an embodiment, write optimization logic 130 relies on flow control and buffering of the TCP protocol and does not implement dedicated buffers. For example, the write optimization logic 130 may implement a process having the following general steps: Read, from a socket connection, header values of an UNSTABLE write call; increment a counter that counts the number of calls per file handle-user pair; forward the call to the server; upon completion of forwarding, if there are already pending calls for the same file handle-user pair, then generate a local reply and send the local reply to the client; upon receiving a completion indication that the local reply was sent, get the next call from the client. In an embodiment, a next call is read from the client only after the original call is forwarded and the reply was sent successfully to the client; this approach prevents the client from overloading the local server 106 or other optimization node, or the network. Further, the approach relies on TCP's flow-control to advertise possible congestion in the network.

In an embodiment, any reply for this call is tracked. When a reply is received from the server the reply is either dropped because a local reply was previously made, or the server reply is passed through to the client.

In an embodiment, write optimization logic 130 is configured to perform write/commit verifier handling. For dealing with various error scenarios, such as server restart, NFSv3 defines a verf field in write and commit replies. If the verf value changes between write or commit replies, the client must re-transmit all un-committed data again. In an embodiment, write optimization logic 130 generates a local verifier field per session, upon the creation of a session, and the local verifier field value is different from the one used by the server. In an embodiment, the write optimization logic 130 changes the verifier value if the server's verifier changes, and tracks the server's verifier value for this purpose. In an embodiment, write optimization logic 130 also changes the verifier value if the session is restarted, and maintains a running counter for this purpose.

The present approach effectively implements error handling. The local replies assume success of the write operation. NFS is inherently error prone in this manner to asynchronous write calls, as it already uses asynchronous operations even when the application API uses a synchronous system write call. As a countermeasure, the write optimization logic 130 always keeps one call "in the air" or not replied to. This approach allows the write optimization logic 130 to reply with an error to the client as soon as the logic receives an error reply return from the server on a write call. Further, the approach will not allow a file to be fully written, such that write calls are replied locally as though they were executed successfully, in the presence of errors on the server. In an embodiment, if a server reply is received and the write optimization logic 130 determines that the reply indicates that an error occurred on the server, then the write optimization logic 130 can reply to following calls with the server error reply.

In various environments, different server write replies may contain different error codes. In an embodiment, the local reply generated by the process herein includes an error code for the most recently received server error reply. This approach is used because clients cannot normally address each different error as if occurs because the client application, typically located at a higher logical layer in the client, normally returns successfully before the NFS client even receives the first reply. An approach that generates at least one error is sufficient to cause the client to retransmit or to abort the writing process. The approach herein also ensures that a client receives an error on a subsequent attempt to perform a write operation and not for an unrelated call.

3.3 Design Details—Example Software Architecture

In an embodiment, the write optimization logic 130 may be implemented using an object-oriented programming environment to create a plurality of software packages each associated with processing requests and replies for a different protocol or protocol layer. In an embodiment, an nfsv3 package contains the classes relevant for NFSv3 optimizations:

RPC Services: different services for getting ONCRPC packets:
- NFSv3—runs in local server 106 and handles NFSv3 calls
- Read Ahead—runs in a core network host and handles Read Ahead algorithm; this service is not required for an implementation but is identified herein for completeness NFSv3 Procedure Specific Handlers: classes for dealing with specific NFSv3 procedures such as Commit, Write and Read Xcoding classes: classes used for representation of various call/reply structures (used for decoding/encoding)

Figure 3D:
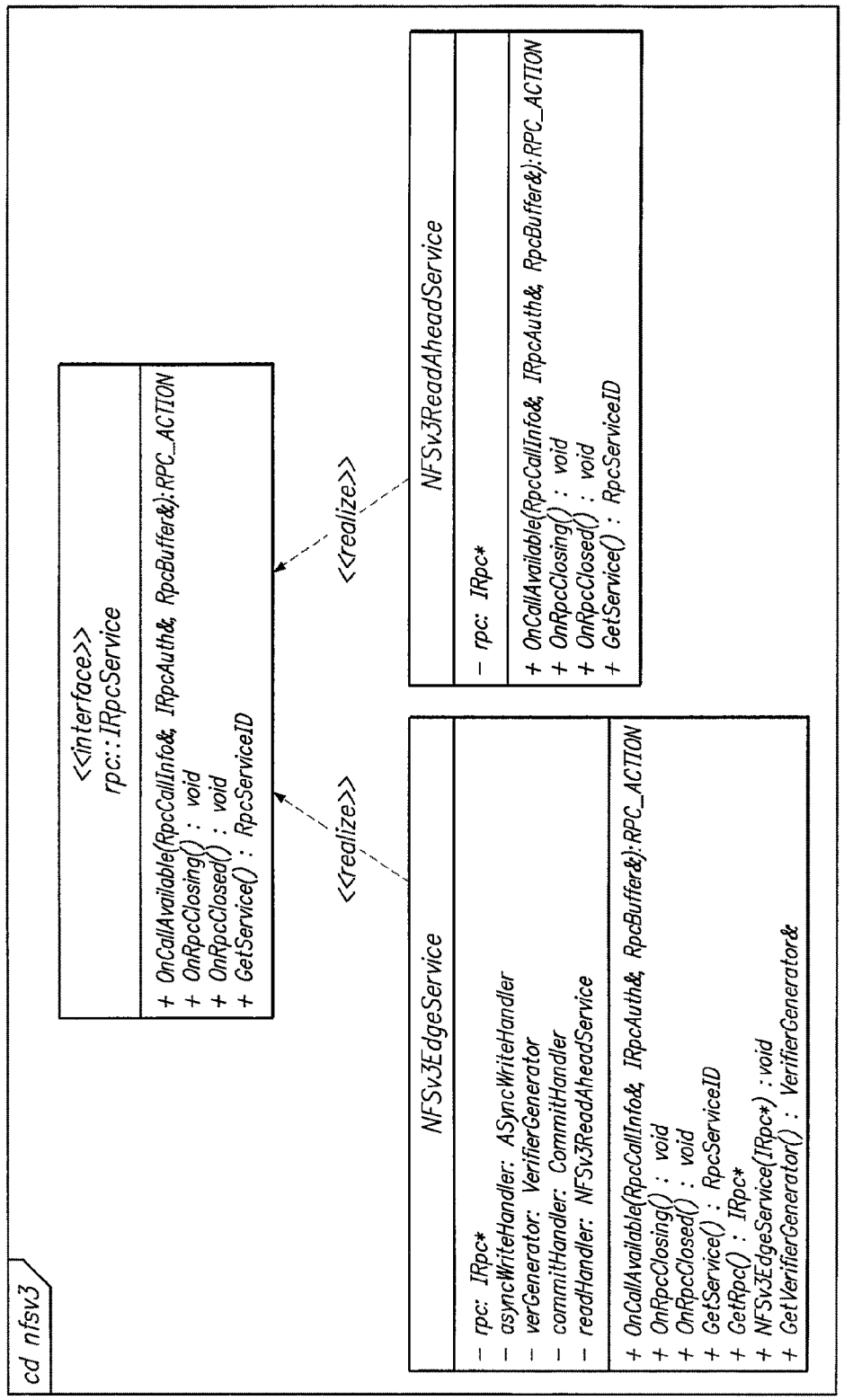
FIG. 3D is a class diagram that shows relationships of classes that implement RPC Services in the package.
Figure 3E:
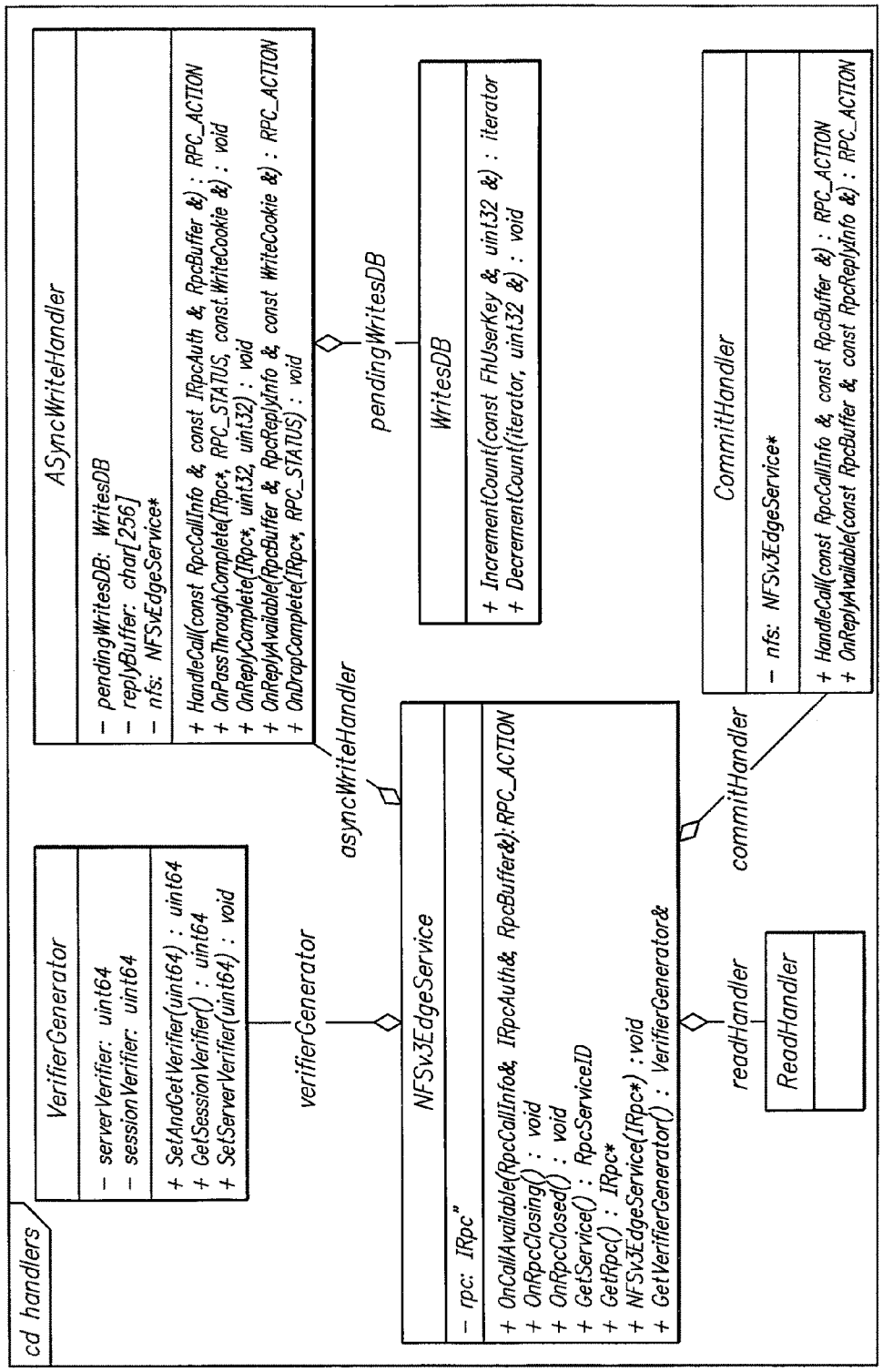
FIG. 3E is a class diagram that shows relationships of procedure-handlers classes for commit, write and read procedures.

FIG. 3D is a class diagram that shows relationships of classes that implement RPC Services in the package. FIG. 3E is a class diagram that shows relationships of procedure-handlers classes for commit, write and read procedures. In an embodiment, NFSv3EdgeService composes the three handler classes and a VerifierGenerator utility class, which implements a per session verifier for Commit/Write replies. In an embodiment, the NFSv3EdgeService class is instantiated on the edge side of the session, such as in local server 106, per RpcSession and is the handler service for all NFSv3 calls. During instantiation the NFSv3EdgeService registers to the RPC layer using an RpcServiceID value that is equal to {prog=100003, vers=3} which causes RPC to deliver all NFSv3 calls to the service. After receiving a call, the service class directs the call to the relevant handler (for write, commit and read) or passes the call through to a client or server. The NFSv3EdgeService class also is responsible to process RPC problems, such as session closing by removing certain data structures and allocated resources upon receiving OnRpcClosing event and un-registering from RPC in response to receiving an OnRpcClosed event.

Figure 3F:
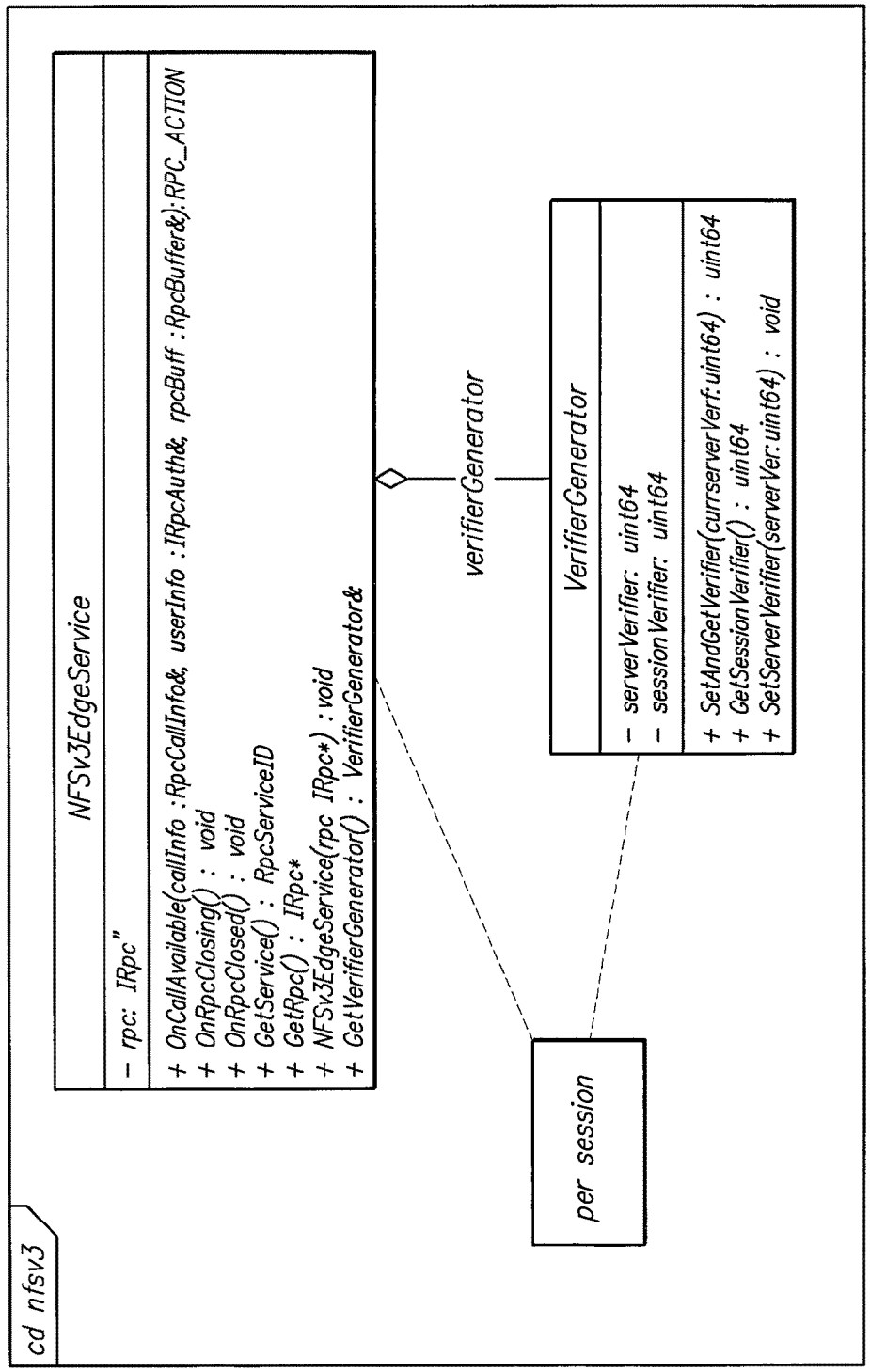
FIG. 3F illustrates relationships of the NFSv3EdgeService class and VerifierGenerator class.

FIG. 3F illustrates relationships of the NFSv3EdgeService class and VerifierGenerator class. In an embodiment, the VerifierGenerator is a utility class that implements the verifier requirements that have been described herein. During startup the VerifierGenerator class allocates a random verifier value, which may be a static class member, and increments the value each time the VerifierGenerator constructor is called to instantiate a new session. This approach assures that if a session is restarted, a different verifier will be used. In an embodiment, the VerifierGenerator tracks the server verifier value and if the verifier value of the server changes, based on analyzing replies from the server, the VerifierGenerator also changes the local verifier value.

In an embodiment, an ASyncWriteHandler worker class implements the write logic described herein including pass-through of all synchronous write calls and replies, and providing local replies for NFSv3 asynchronous write calls. In an embodiment, the ASyncWriteHandler class also implements the asynchronous write reply logic for managing verifier values as described herein. In an embodiment, each instance of the ASyncWriteHandler class manages a database, which may comprise a hash_map, for supporting the asynchronous write logic that has been further described herein.

FIG. 3G illustrates members of the ASyncWriteHandler class, in one embodiment. In an embodiment, the ASyncWriteHandler class has as members: pendingWriteDB: a hash for handling local replies; replyBuffer: a buffer that carries the payload for locally generated write replies; and nfs: a pointer to the NFS Service that instantiated the class. In an embodiment, the ASyncWriteHandler class refers to a WritesDB class that wraps the hash_map with a specific key and value that is used by the NFSv3 write logic. The particular mode of implementing the WritesDB class is not critical. In one embodiment, the hash table key is based on file-handle and user; the file-handle ensures that the key is tied to the file that the client is writing, and the user indication in the key ensures that one user's permission errors do not affect the stream of the other, thereby providing better security.

Figure 3H:
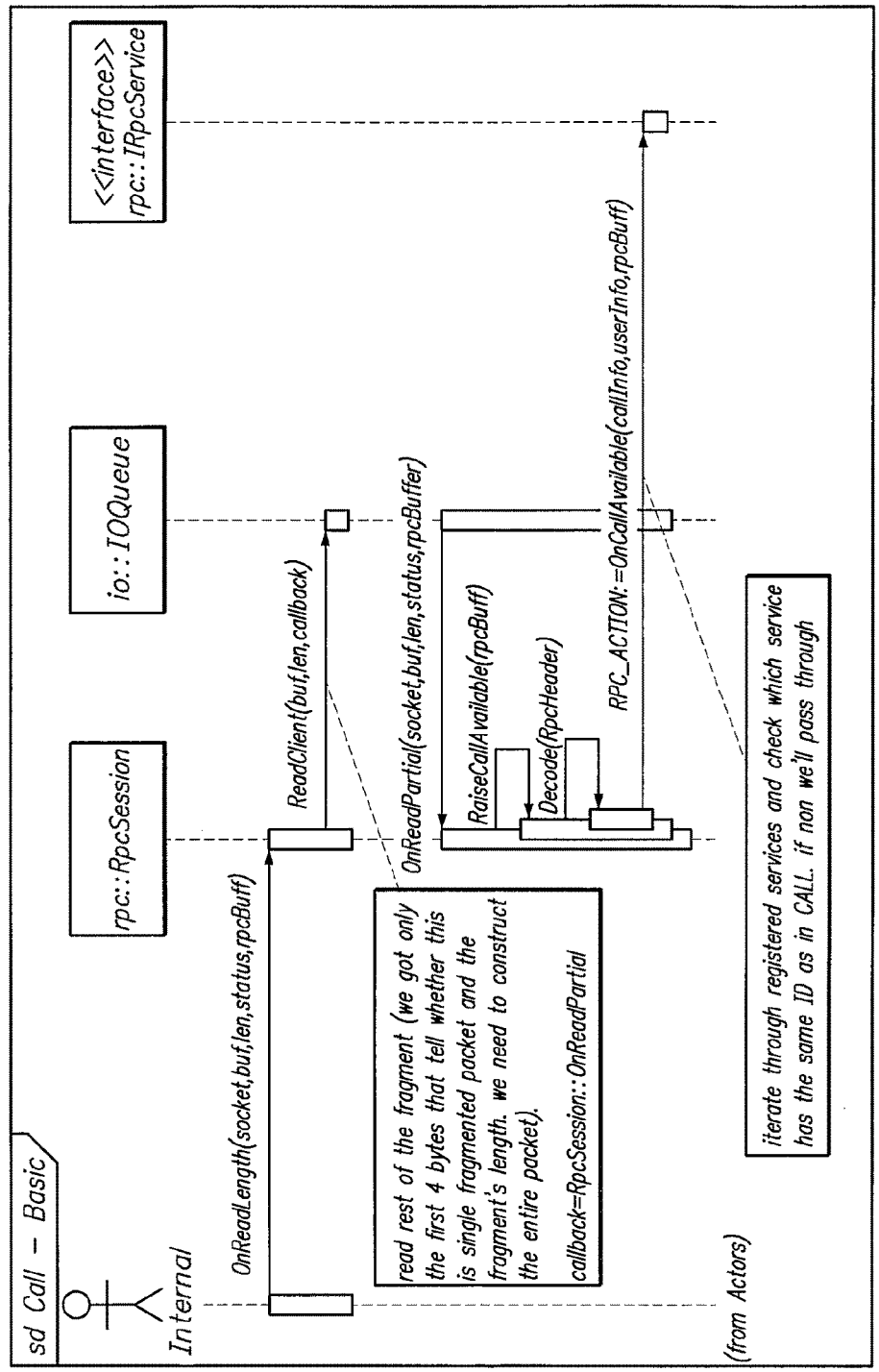
FIG. 3H is a sequence diagram that illustrates an example receiving an RPC Call packet.

In an embodiment, an rpc software package comprises classes that process receiving function calls and replies, network errors, and other issues. FIG. 3H is a sequence diagram that illustrates an example receiving an RPC Call packet. In an embodiment, a data processing sequence starts by invoking (ao-shell invokes IOQueue that invokes this callback in rpc layer) the relevant callback method in the relevant RpcSession instance. Once a new session arrives, the logic begins reading from both sides and the callback is invoked when an expected 4 bytes of data is received. The process then reads min {complete_fragment, 1 KB}.

When the second read completes another callback is invoked. RpcSession performs ONCRPC decoding and notifies the relevant RPC Service that a call has arrived for it, assuming that the rpc layer does not pass-through the call. Various RPC Services (e.g. NFSv3, Read-Ahead) register with unique ID to receive an RPC call from the RPC layer during a new session. If no service is registered for the ID, then the call is passed-through to the local server 106 for NFSv2 and NFSv4 packets. In an embodiment, RpcSession passes-through calls in the following cases: RPC authentication type not NULL, UNIX or SHORT (i.e. pass-through Kerberos); Message type isn't CALL; No service is registered for this ID. RpcSession drops calls when the call is already pending because the call was sent to the local server 106 but no reply was received.

Figure 3J:
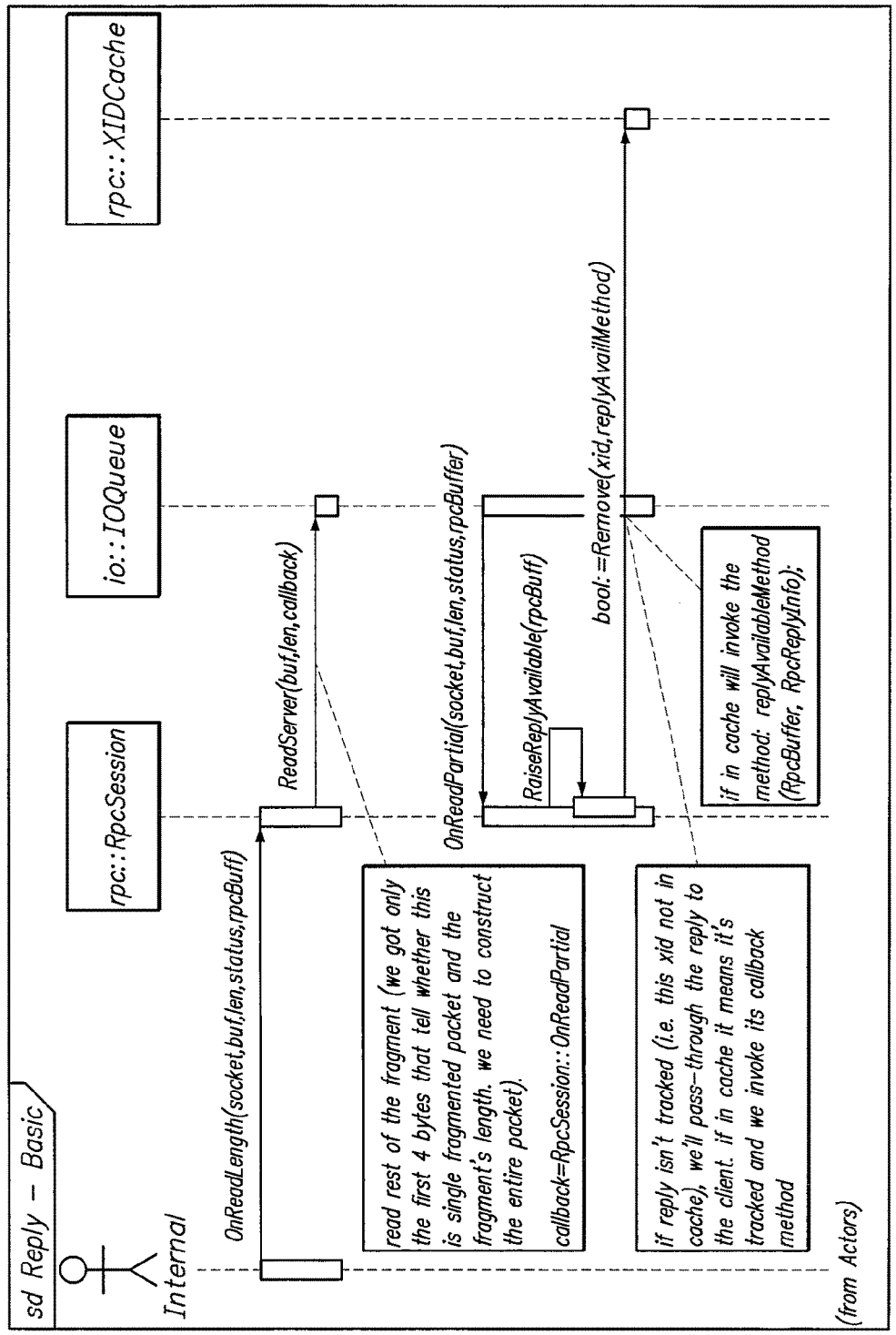
FIG. 3J is a sequence diagram that illustrates receiving an RPC Reply packet.

FIG. 3J is a sequence diagram that illustrates receiving an RPC Reply packet. In an embodiment, upon receiving a reply packet the logic performs RPC header decoding and then checks to determine if the specified XID is tracked, meaning that one of the services called trackReply for this XID. If the reply is not tracked, the logic passes the reply through to the client. If the reply is tracked, then the process invokes its callback, which was registered during the trackReply operation. Thus, replies that are not of interest bypass the RPC layer and will not arrive to the service layer.

Figure 3K:
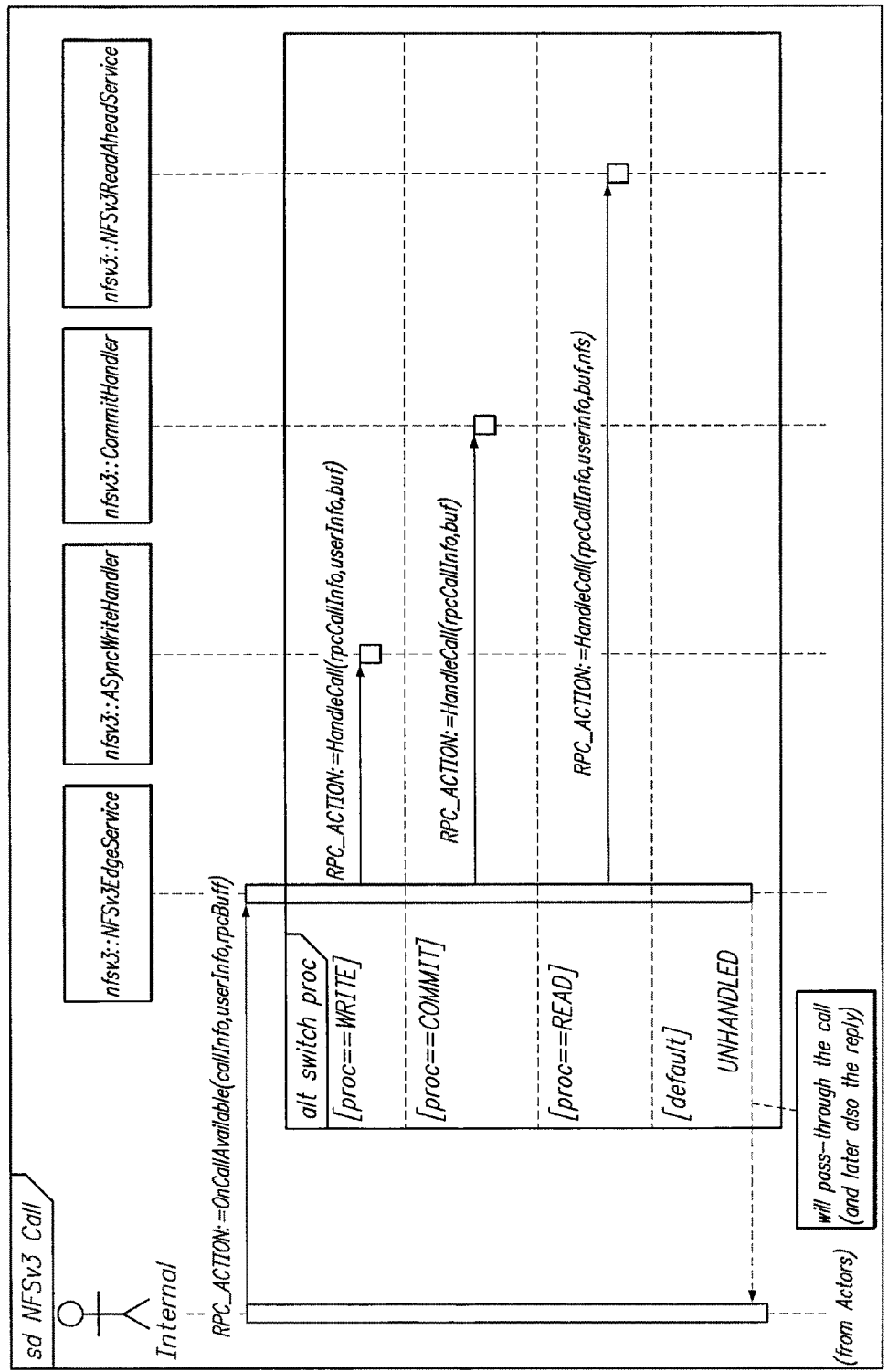
FIG. 3K is a sequence diagram that describes call arrival processing in the NFSv3 layer.

In an embodiment, an NFSv3 optimization layer performs the following principal processing operations. FIG. 3K is a sequence diagram that describes call arrival processing in the NFSv3 layer. In an embodiment, when a session is created in an edge device such as local server 106, the process instantiates an NFSv3EdgeService object, and in a constructor method the object registers using NFSv3's specific service ID. Thereafter when an ONCRPC call arrives at the RPC layer, RPC provides the relevant service, according to Service-ID, each call that RPC has received by calling an OnCallAvailable virtual method.

In an embodiment, when an NFSv3 call occurs, NFSv3EdgeService examines the procedure number in the RPC header and directs the call to the write, commit or read handler based on the value of the procedure number. If procedure is not one that NFSv3EdgeService can process, the method returns IRpc::UNHANDLED to the RPC layer, and consequently the call will be passed-through to higher layers for handling. Thus, NFSv3EdgeService serves as a dispatcher for each call to an appropriate handler and substantive processing is performed in the relevant handler class.

Figure 3L:
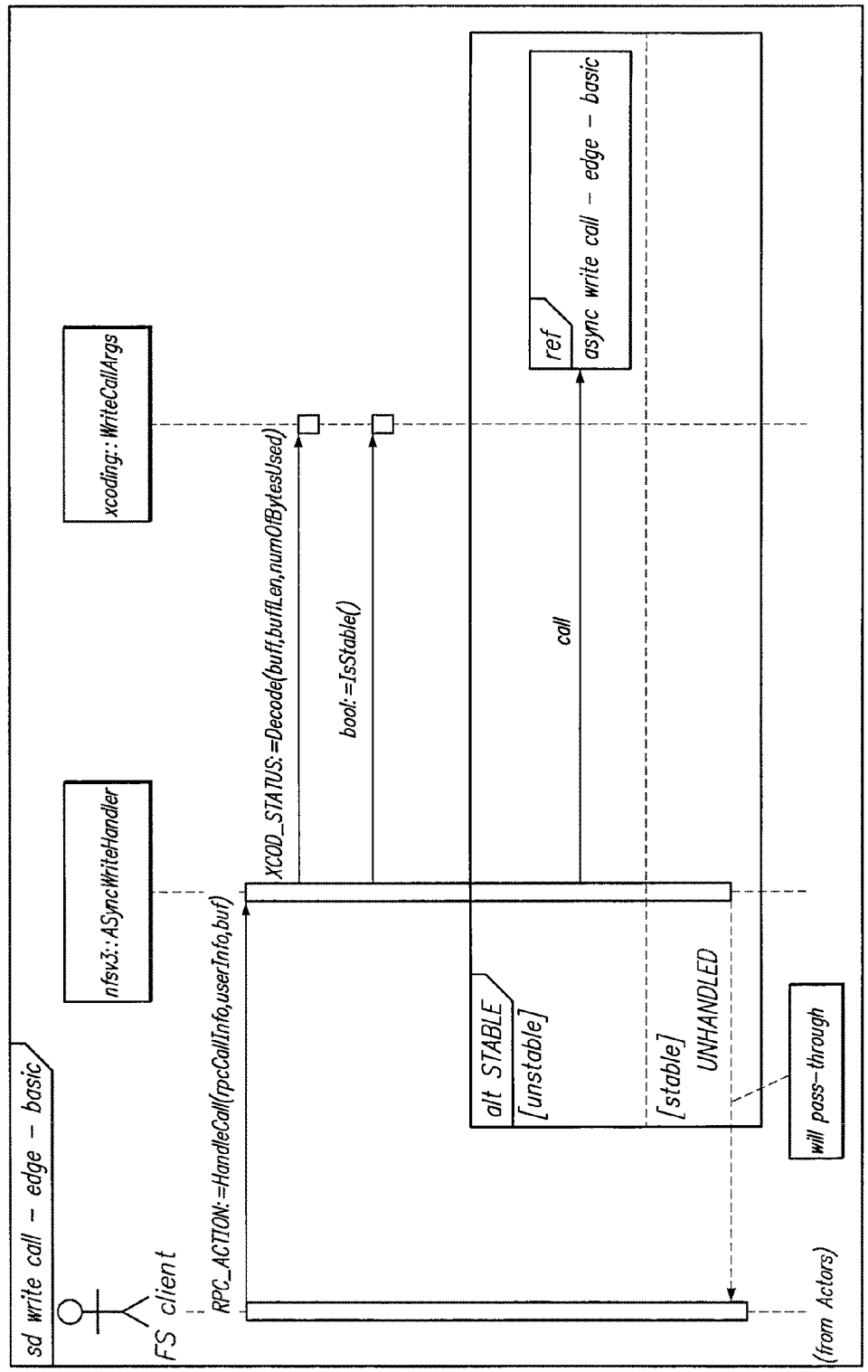
FIG. 3L is a sequence diagram showing processing a write call.

FIG. 3L is a sequence diagram showing processing a write call. In embodiment, the logic decodes the write arguments from the RPC buffer into a WriteCallArgs struct. If the call does not have UNSTABLE set, then the logic returns UNHANDLED to RPC, which causes the call to be passed-through by the RPC layer. The reply also is passed through to the client. If UNSTABLE is set, then processing continues with asynchronous write call processing as further described herein.

Figure 3M:
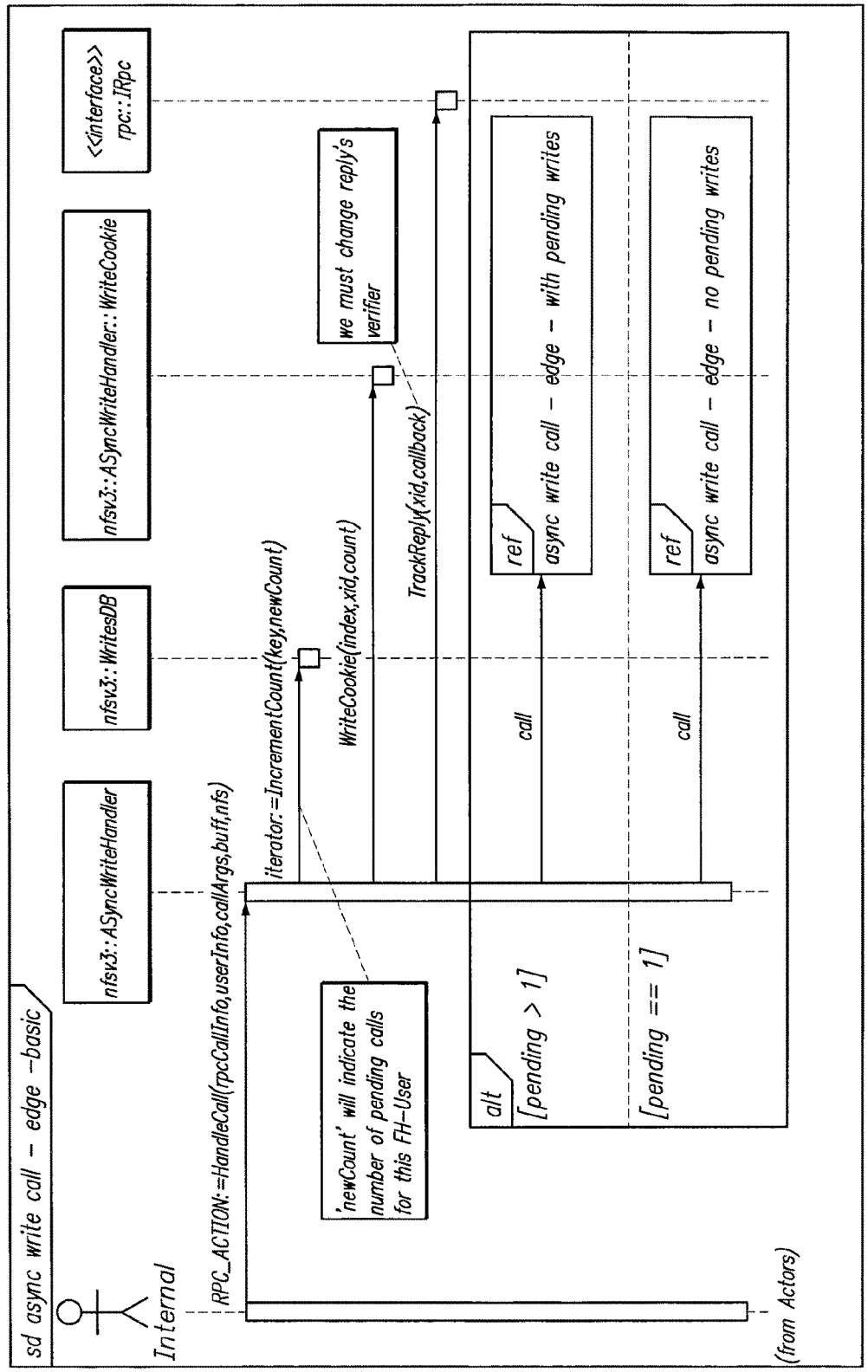
FIG. 3M is a sequence diagram that illustrates processing asynchronous write calls.

FIG. 3M is a sequence diagram that illustrates processing asynchronous write calls. In an embodiment, AsyncWriteHandler manages a database that is indexed by file handle-user identifier pair. Each such pair has one entry in a hash table that serves as the database. Each entry stores the number of pending calls for that pair. A counter stored in the entry is incremented upon arrival of a call and decremented upon arrival of a reply. Other fields in the entry support local reply generation. Since database entries are modified when a reply returns, an iterator is maintained for an entry to preclude the need to look up the entry again during reply processing; in an embodiment, the iterator is stored in a WriteCookie.

In an embodiment, the database is updated in response to the arrival of a particular call by incrementing the file handle-user identifier pair's counter in the database entry, if an entry exists. If an entry doesn't exist for the file handle-user identifier pair, the logic creates an entry using default values such as counter=1. The logic creates a WriteCookie and tracks the associated XID to change its verifier and optionally drop it if a local reply is sent.

Subsequent processing depends on the number of pending calls. If there are pending calls other than the one that just arrived, the process continues using "pending writes" processing as described below for FIG. 3P. Alternatively, processing for "no pending calls" is performed according to FIG. 3N.

Figure 3N:
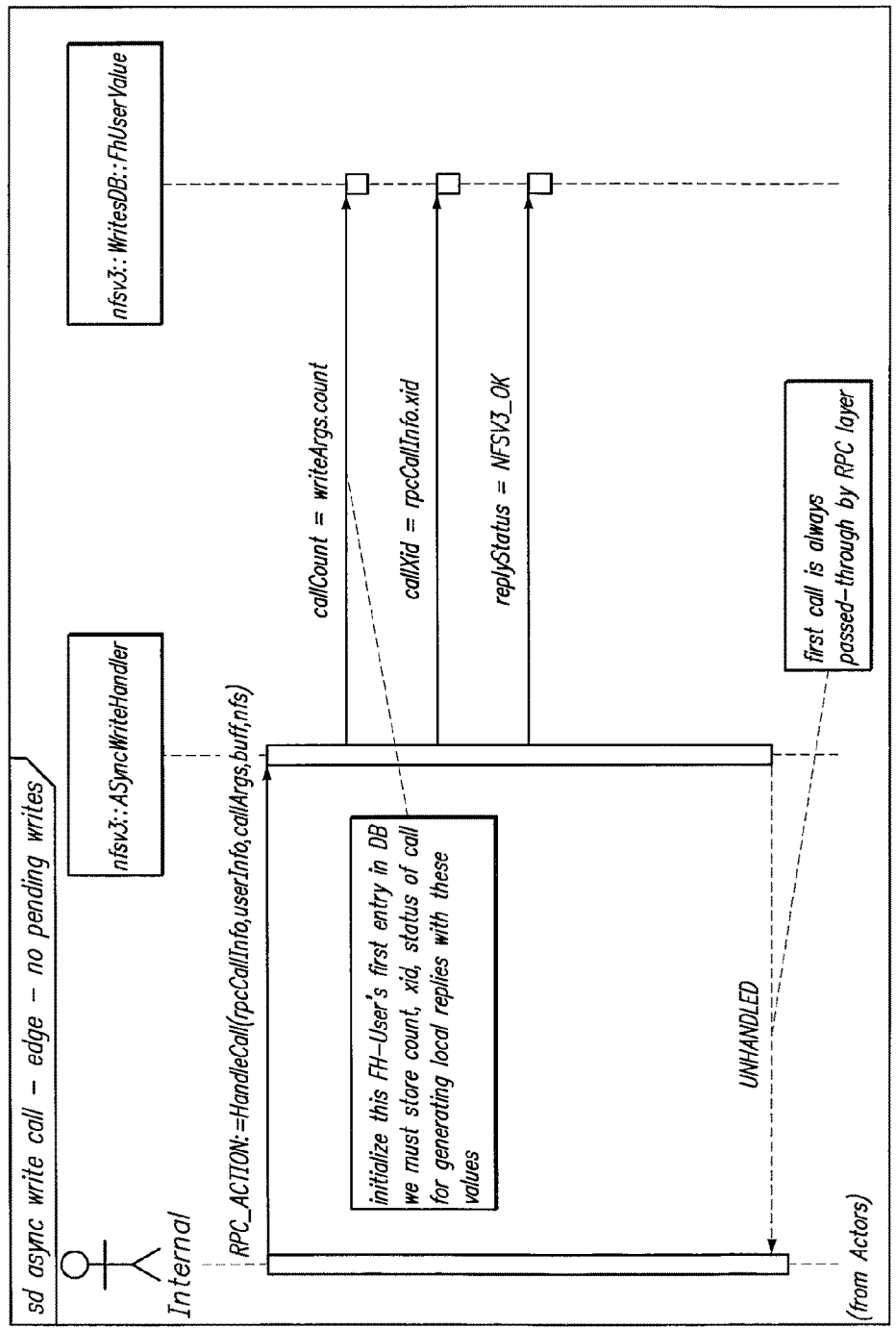
FIG. 3N is a sequence diagram that illustrates processing when there are no pending calls for the pair.

FIG. 3N is a sequence diagram that illustrates processing when there are no pending calls for the pair. In an embodiment, the relevant database entry is updated with the arguments of the call and the UNHANDLED value is returned to RPC. Consequently, RPC will pass-through the call. However, since all UNSTABLE write replies are tracked, the NFSv3 logic will receive notification when a reply returns for the current call. The entry is updated for use by other calls. For example, if the next call arrives then the process should reply to the client with arguments for the previous call, such as XID, count, etc.; to reply with such values, the value for the previous call are maintained in the database entry.

Figure 3P:
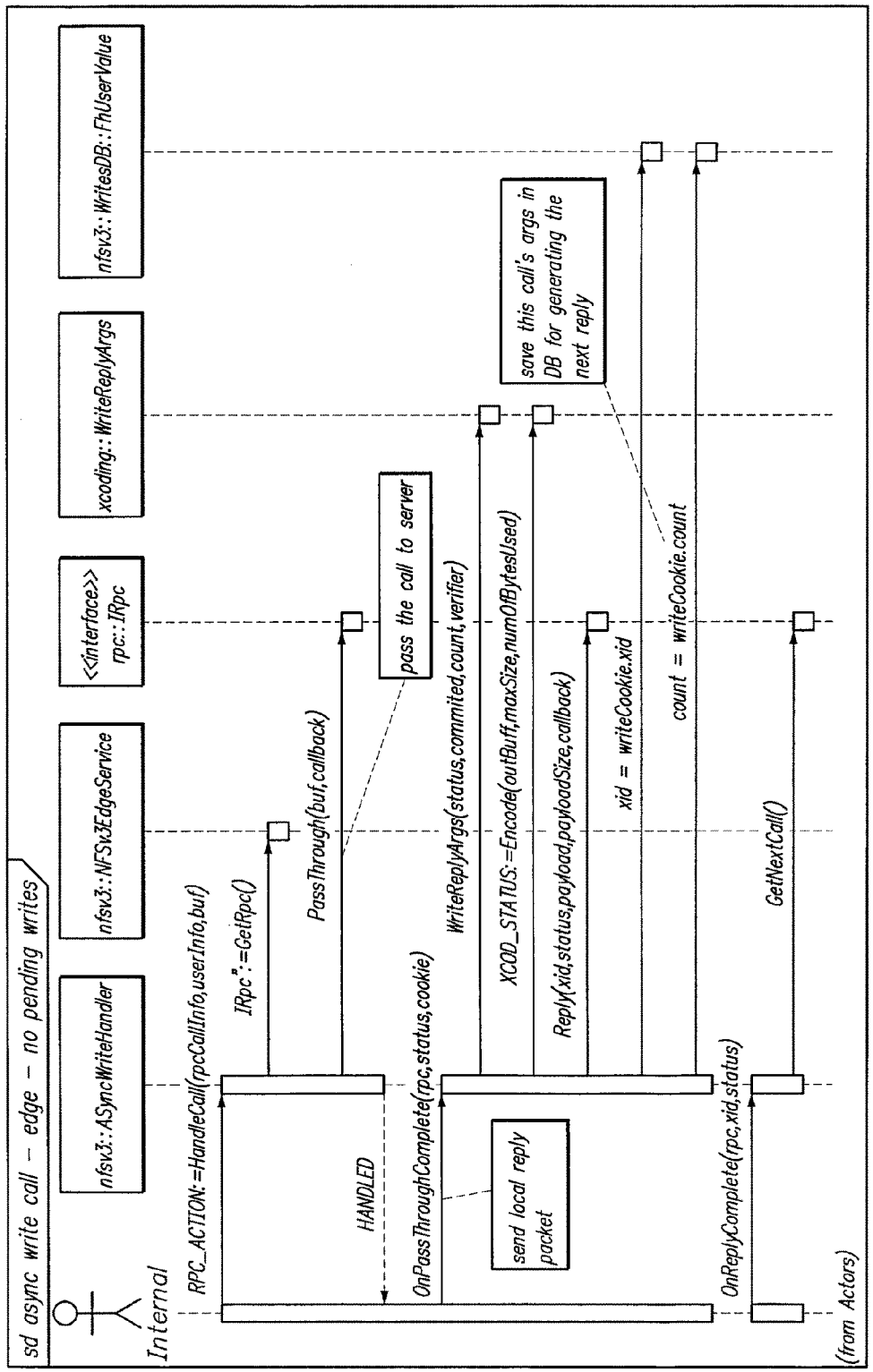
FIG. 3P is a sequence that illustrates processing when a particular file handle-user identifier pair has other calls pending.

FIG. 3P is a sequence that illustrates processing when a particular file handle-user identifier pair has other calls pending. In an embodiment, the original call is passed through and values of relevant fields are stored in the write cookie. The RPC layer is signaled that a packet was HANDLED, which allows RPC to free resources but not receive the next call. When the pass-through operation completes, which is reported by RPC using an asynchronous event, the logic creates a local reply, encodes the reply using values of fields obtained from the relevant database entry, and sends the reply to the client. After sending the reply to the client, the logic updates the WritesDB relevant entry with the arguments of the call, for use in the next local reply. When reply completes, the logic signals RPC that it can obtain the next call for the session.

Figure 3Q:
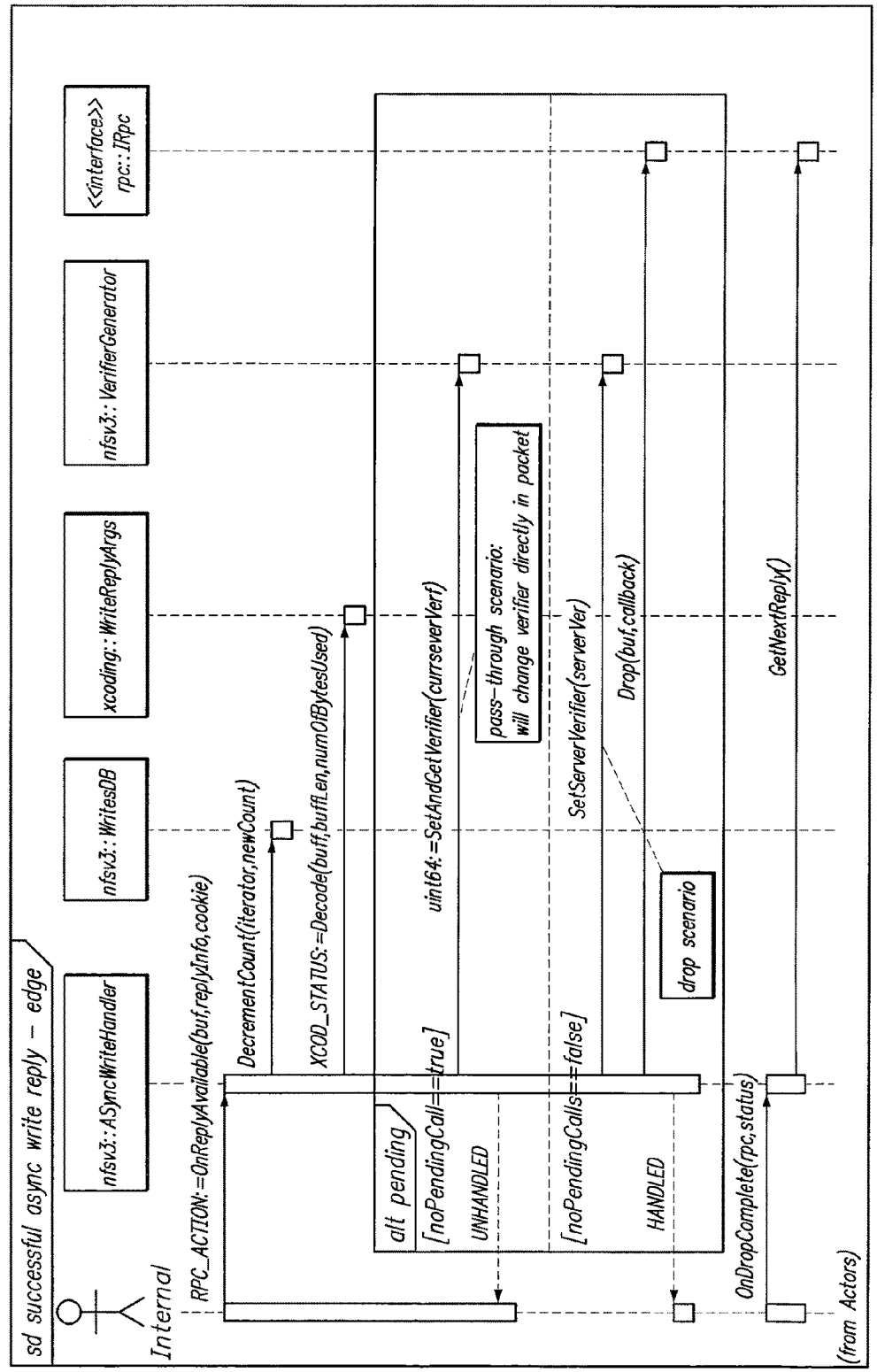
FIG. 3Q is a sequence diagram that illustrates processing an asynchronous write reply.

FIG. 3Q is a sequence diagram that illustrates processing an asynchronous write reply. In one embodiment, in response to receiving a notification from the RPC layer that an asynchronous write reply was returned, the logic updates the database entry by decrementing the counter for the current file handle-user identifier pair. If there are no pending calls (counter=0), then the reply is passed through to the client because it was not replied locally. Otherwise, if pending calls exist, then the reply is dropped because its call was answered locally.

Thus, two options are processed when a reply returns. In a Pass-Through Option, the call wasn't answered locally so the logic needs to pass-through the reply to the client. The verifier value is changed to be the same as in the local replies. In a Drop Option, the logic drops the reply, because a reply was already sent locally, but the verifier received from the server is used. If the server has changed its verifier, the logic also changes the verifier for the current session.

4.0 MSRPC Embodiments
4.1 Overview

In one embodiment, methods are provided to improve compression and reduce latency of applications running on MSRPC over SMB in a WAN environment. Embodiments provide a combination of techniques to address shortcomings in the handling of MSRPC by WAN optimizers. In some embodiments applying the described set of techniques to MSRPC traffic may result in a better user experience due to lower response times relating to local acknowledgments, and shorter transfer times due to improved compression. In some embodiments the improved compression rates may also positively affect the network state (e.g. congestion is lower).

MSRPC (derived from DCERPC), may be used as a transport protocol for remote communication between Microsoft-based clients and servers. Some examples include DCOM and communications between Microsoft Exchange Server and Microsoft Outlook client processes. The performance of MSRPC in WAN environments is often less than optimal. Various techniques have sought to optimize remote access to applications over the WAN by employing a combination of TCP optimizations and compression. Due to specific implementation details, such as the data encoding and functional behavior of MSRPC, these techniques may not be able to realize the full gain of simple compression. The present approach provides methods that can be applied to MSRPC traffic to improve both compression and response time, specifically when SMB is used as the RPC transport.

In an embodiment, MSRPC traffic is optimized using local acknowledgment and buffering of RPC fragments, coupled with coherency guarantees; and by re-arrangement of RPC headers and payloads before compression, or alternatively, using application level hints to a compression engine regarding location of headers and offsets. In an embodiment, other protocol specific optimizations may be used in addition to the techniques herein.

Remote Procedure Calls are a software mechanism useful in decoupling the caller from the physical location of the called process. Local calls appear and function just as a distributed function call. RPC infrastructure is responsible for binding and maintaining the calling context, and marshaling function arguments. Each procedure call is transformed into one or more RPC fragments that are carried over a transport such as TCP, UDP, SMB or HTTP.

A maximum fragment size is negotiated during the initial RPC service binding phase. Thus, procedure calls that exceed the value must be split into more than one fragment. To allow the remote peer to reconstruct the call, every fragment carries an RPC header. The header specifies fragment properties such as service or function identifier, a sequence number and an indication if the fragment is first, last or intermediate in the RPC call it encodes.

While MSRPC may use any transport (for example, Microsoft Exchange traffic typically uses TCP or HTTP), certain services are commonly carried over CIFS or SMB. One example is printer traffic, as Microsoft server based deployments tend to bundle file and print services on the same service or server. The optimizations herein are useful for print traffic and also for other traffic or protocols that use CIFS or SMB.

In the case of SMB, the RPC request and response are broken into multiple synchronous SMB operations, including transact and read/write operations, used to initiate and carry the RPC information. Since the fragment size is often considerably lower than the maximum SMB payload (for example, about 5.5 KB vs. 64 KB), an operation may result in many fragments with each fragment incurring a RTT latency for SMB transport level acknowledgment. Another side effect, stemming from the inclusion of sequence numbers, is that DRE aggregation is limited: the data is intermixed with changing sequence numbers.

A dual proxy wide area optimization system, having a proxy node on either side or edge of a WAN, can improve both the latency and compression of the RPC exchange, without caching RPC responses and without any (or significant) protocol specific knowledge. The optimizations herein can be extended to include further optimizations as well, including negotiation of larger fragments, or transaction prediction, for example, to speed up the connection setup sequence. In an embodiment, the optimizations herein are performed by both nodes in a wide area optimization node, but a file server or client computer are not involved in performing optimization operations.

4.2 Local Acknowledgment of RPC Fragments

In an embodiment, to reduce latency, a peer may locally acknowledge RPC fragments. The fragments may be streamed in the background asynchronously or batched for a single send operation across the WAN. Since the last fragment in an RPC is explicitly marked by the caller RPC stack, the optimization peer may send the last fragment synchronously to the server, to guarantee delivery of the whole RPC. Any previous failure in delivery can be signaled to the sender on receipt of the last fragment.

If using the "Last Fragment" indication is not considered sufficiently safe, the amount of data locally acknowledged and buffered can be limited, and this may also improve system scaling. Thresholds can be set per client, service, etc, and may be based on number of fragments or byte counts.

Local acknowledgments can improve latency of large RPC calls. For example, a typical window used by Microsoft is about 32 KB, but in operation a typical document to print may be considerably larger. Incidentally, compression may also improve as more data is available for processing.

The indication of "last" fragment is also useful in control buffering behavior of the network stack. As long as the headers indicate more fragments are expected, and the "RPC window" is not full, the peer can continue reading from the LAN side socket, expecting additional data. Such metadata, takes the guessing out of determining data may be buffered or sent for further processing.

Thus, in an embodiment, logic in an optimizer node such as local server 106 receives, from a client process such as any of clients 102A, 102B, 102C (FIG. 1), a first fragment of a remote procedure call that conforms to MSRPC and directed to a server across a wide area network. The logic determines whether a second fragment of the same remote procedure call has been received previously. When a related second fragment has been received previously, then the logic sends, to the client process, a first reply to the second fragment, and forwards the first fragment to the server. Otherwise the first fragment is forwarded to the server without sending any reply to the client for the first fragment. In this approach, the local reply approach described above for NFSv3 is implemented in the context of fragmented MSRPC calls over a WAN. Local replies sent to the client will induce the client to send an uninterrupted stream of MSRPC call fragments, resulting in improved throughput of data.

In an embodiment, each local reply sent back to the client includes a fragment header comprising one or more MSRPC identification values that associate the reply with a corresponding fragment that the client previously sent.

Error processing may be implemented. In an embodiment, the approach further comprises receiving from a transport protocol a delivery failure message specifying a failure to deliver one or more of the first fragment and the second fragment, and sending the delivery failure message to the client process in response to receiving a last fragment from the client process.

Figure 5A:
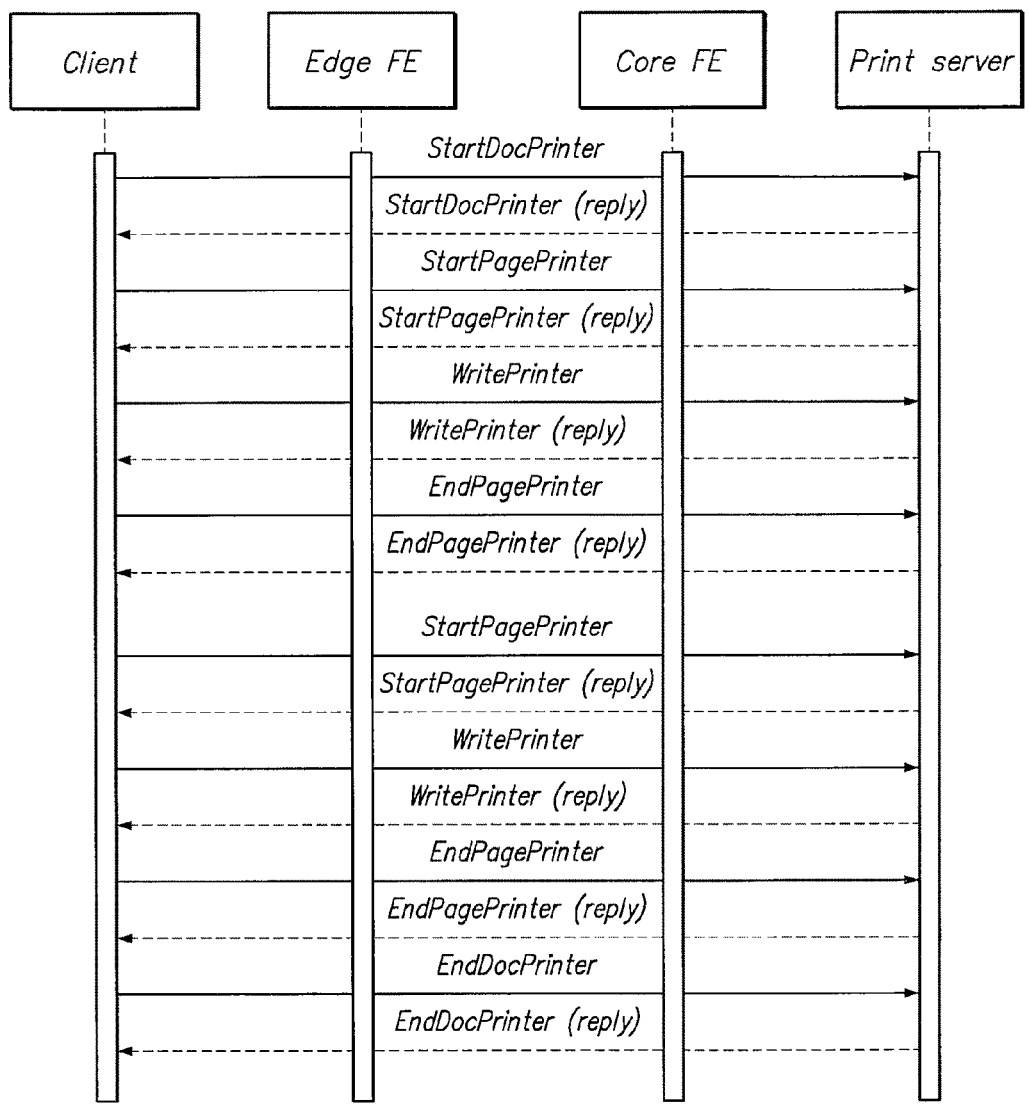
FIG. 5A illustrates messages involved in spooling of a document to a print server.

FIG. 5A illustrates messages involved in spooling of a document to a print server. In this approach, all commands are passed through to the client and print server. The client waits after each RPC command for a reply from the print server, which causes undesirable delays. When RPC commands are used, having a size greater than 1 KB, performance becomes worse. Each RPC command is split by the client into a number of 4 KB fragments. A next fragment is sent only after the client receives an acknowledgement to the previous fragment from the SMB layer.

In an embodiment, an asynchronous write approach may be used for sending fragments of RPC commands. For example, StartPagePrinter, WritePrinter and EndPagePrinter commands may be sent in an asynchronous manner to utilize the WAN in an effective way. The inventors have observed in one example that (4 KB/Bandwidth)+RTT seconds were required in one network environment to send 4 KB packet of the print traffic; for example, on a T1 80 ms line, 100 ms is required to send a 4 KB packet, and 10 seconds for sending 400 KB of data. In contrast, using an embodiment, asynchronous handling of the print commands can boost WAN utilization to its maximum, so that sending of 400 KB of data over the T1 80 ms line will take about 2.1 seconds.

Figure 5B:
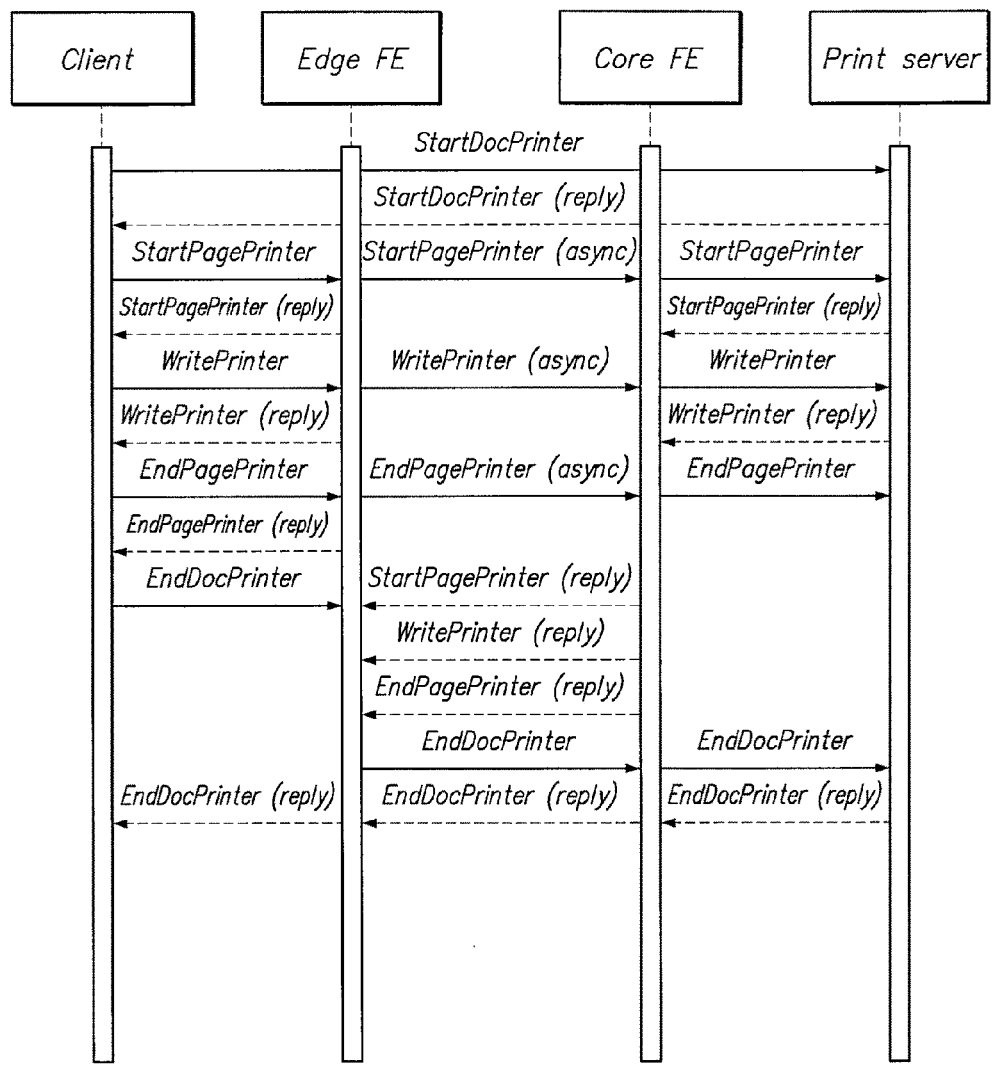
FIG. 5B is a sequence diagram that illustrates an approach for locally replying to MSRPC calls in a printing context.

FIG. 5B is a sequence diagram that illustrates an approach for locally replying to MSRPC calls in a printing context. In an embodiment, the client sends large RPC commands (greater than 1 KB) using a sequence of SMB Write commands. Microsoft's implementation of DCE-RPC over SMB limits the size of fragments to 4280 bytes. Hence each write command carrying a DCE-RPC fragment is limited in size to 4280 bytes. In an embodiment, these commands are sent in asynchronous manner to the print server and logic in a network node issues a local reply to the client.

As a result, the client can achieve a significant increase in the rate of issuing commands. If a remote failure occurs, the optimizer logic replies with an error indication to the next incoming request from the client. Since clients do not use shared resources while spooling a print job, so that there is no way to send data for the same job from different places, no coherency issues arise in the present approach.

4.3 Exclusion of RPC Headers from DRE Compression

Due to the inclusion of a sequence number, the same operation performed twice will produce different data for purposes of performing DRE compression or decompression. For example, a changed sequence number may cause DRE to incur a miss on every first and last chunk of a fragment. Removing the RPC headers from the data stream on which DRE operates creates a canonical representation that is more likely to repeat in consecutive operations.

Several methods may be used. For example, RPC headers can be skipped, as the size attribute is known at parse time, via DRE compression hints, or the buffered fragments can have their headers extracted and rearranged together before the actual fragment data. RPC header specific compression may also be applied to further reduce bandwidth required.

5.0 Implementation Mechanisms—Hardware Overview

Figure 4:
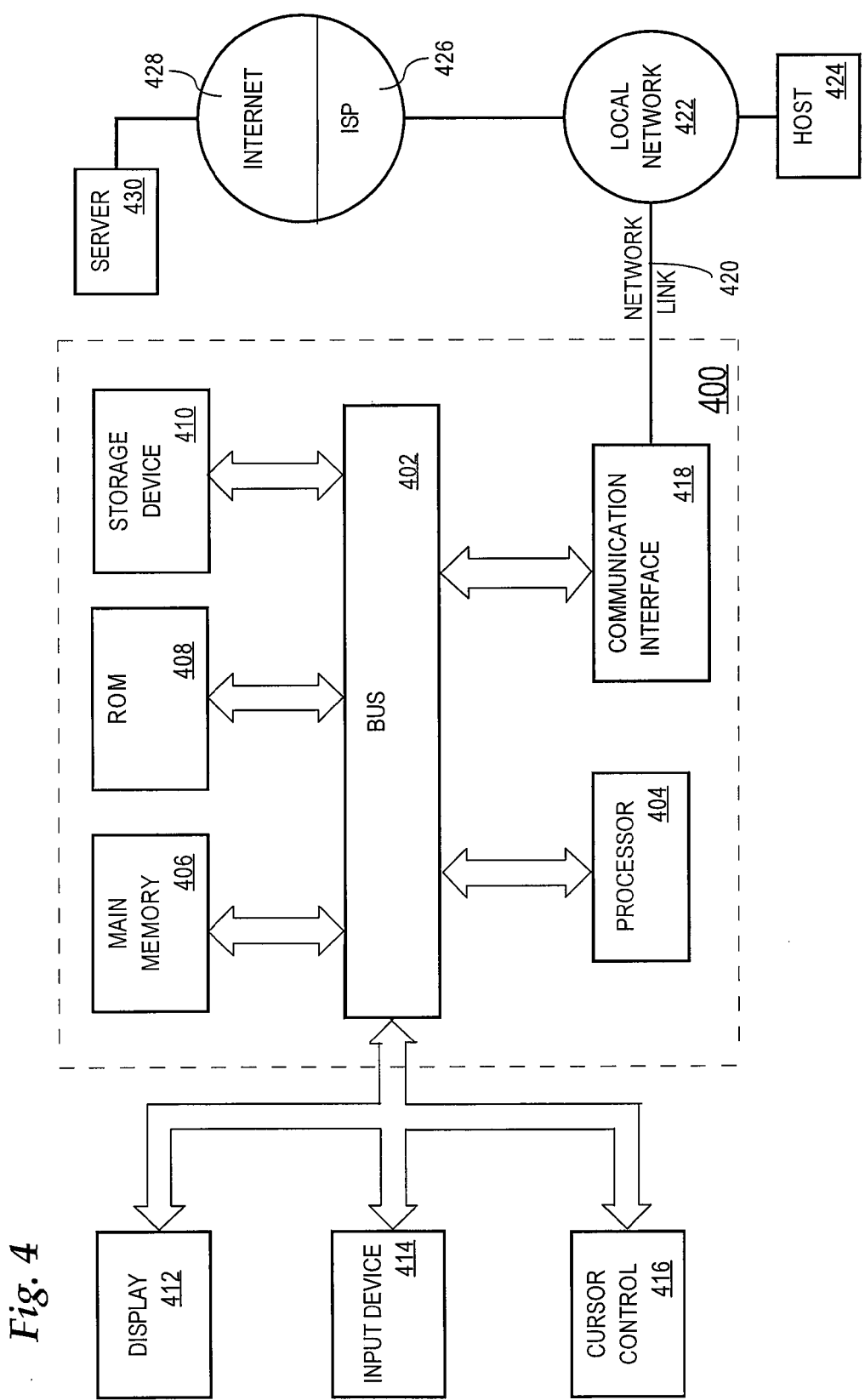
FIG. 4 illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing apparatus, comprising:
    a network interface;
    a processor coupled to the network interface;
    a non-transitory machine-readable volatile or non-volatile storage medium coupled to the processor and storing one or more sequences of instructions which, when executed by the processor, cause the processor to perform:
        at the data processing apparatus, configured separately from a client and a server:
            receiving, from the client, a first request directed to the server across a wide area network;
            determining whether a related second request directed to the server has been received previously and before the first request was received from the client;
            wherein the first request is to write data for a specified file handle on the server and for a specified user, and wherein the related second request is to write data for the specified file handle and for the specified user;
            in response to determining that the related second request has been received previously and before the first request was received from the client,
                generating, at the data processing apparatus, and sending, to the same client, a first reply to the related second request and then forwarding the first request to the server for the server to write the data for the specified file handle and for the specified user,
                and otherwise forwarding the first request to the server without sending any reply to the client for the first request;
            wherein the first reply confirms receiving the related second request;
            forwarding, at any time with respect to the receiving and the determining, the second request to the server.

2. The apparatus of claim 1, further comprising sequences of instructions which, when executed by the processor, cause the processor to perform:
    receiving, from the server, a second reply to a third request to write data for a second specified file handle and a second specified user;
    determining whether the client has been given a second reply to the third request previously;
    forwarding the second reply to the client when the client has not been given a second reply to the third request previously, and otherwise discarding the second reply.

3. The apparatus of claim 1, wherein each request and reply conforms to Network File System protocol version 3 (NFSv3) and wherein each request is an NFSv3 request having an UNSTABLE value set.

4. The apparatus of claim 1, further comprising sequences of instructions which, when executed by the processor, cause the processor to perform:
    receiving, from the server, a second reply to a third request to write a second specified file handle and a second specified user;
    determining whether the client has been given a second reply to the third request previously;
    when the client has not been given a second reply to the third request previously, forwarding the second reply to the client including any error code of the server that is in the second reply, and otherwise discarding the second reply.

5. The apparatus of claim 4, further comprising sequences of instructions which, when executed by the processor, cause the processor to perform: in response to receiving multiple replies from the server for a plurality of client requests that have been forwarded to the server wherein each of the replies comprises a different server error code, sending to the client the most recently received reply with any server error code in that reply.

6. The apparatus of claim 1, wherein the first request is a first fragment of a remote procedure call that conforms to MSRPC, and wherein the second request is a second fragment of the same remote procedure call.

7. The apparatus of claim 6, further comprising receiving from a transport protocol a delivery failure message specifying a failure to deliver one or more of the first fragment and the second fragment, and sending the delivery failure message to the client in response to receiving a last fragment from the client.

8. A non-transitory computer-readable medium carrying one or more sequences of instructions which, when executed by one or more processors, cause the one or more processors to carry out the steps of:
    at the data processing apparatus, configured separately from a client and a server:
        receiving, from the client, a first request directed to the server across a wide area network;
        determining whether a related second request directed to the server has been received previously and before the first request was received from the client;
        wherein the first request is to write data for a specified file handle on the server and for a specified user, and wherein the related second request is to write data for the specified file handle and for the specified user;
        in response to determining that the related second request has been received previously and before the first request was received from the client,
            generating, at the data processing apparatus, and sending, to the same client, a first reply to the related second request and then forwarding the first request to the server for the server to write the data for the specified file handle and for the specified user,
            and otherwise forwarding the first request to the server without sending any reply to the client for the first request;
        wherein the first reply confirms receiving the related second request;
        forwarding, at any time with respect to the receiving and the determining, the second request to the server.

9. The computer-readable medium of claim 8, further comprising sequences of instructions which, when executed by the processor, cause the processor to perform:
receiving, from the server, a second reply to a third request to write data for a second specified file handle and a second specified user;
determining whether the client has been given a second reply to the third request previously;
forwarding the second reply to the client when the client has not been given a second reply to the third request previously, and otherwise discarding the second reply.

10. The computer-readable medium of claim 8, wherein each request and reply conforms to Network File System protocol version 3 (NFSv3) and wherein each request is an NFSv3 request having an UNSTABLE value set.

11. The computer-readable medium of claim 8, further comprising sequences of instructions which, when executed by the processor, cause the processor to perform:
receiving, from the server, a second reply to a third request to write a second specified file handle and a second specified user;
determining whether the client has been given a second reply to the third request previously;
when the client has not been given a second reply to the third request previously, forwarding the second reply to the client including any error code of the server that is in the second reply, and otherwise discarding the second reply.

12. The computer-readable medium of claim 11, further comprising sequences of instructions which, when executed by the processor, cause the processor to perform: in response to receiving multiple replies from the server for a plurality of client requests that have been forwarded to the server wherein each of the replies comprises a different server error code, sending to the client the most recently received reply with any server error code in that reply.

13. The computer-readable medium of claim 8, wherein the first request is a first fragment of a remote procedure call that conforms to MSRPC, and wherein the second request is a second fragment of the same remote procedure call.

14. The computer-readable medium of claim 13, wherein each reply includes a fragment header comprising one or more MSRPC identification values that associate the reply with a corresponding request.

15. An apparatus, comprising:
one or more processors;
at the data processing apparatus, configured separately from a client and a server:
means for receiving, from the client, a first request directed to the server across a wide area network;
means for determining whether a related second request directed to the server has been received previously and before the first request was received from the client;
wherein the first request is to write data for a specified file handle on the server and for a specified user, and wherein the related second request is to write data for the specified file handle and for the specified user;
means, operable in response to determining that the related second request has been received previously and before the first request was received from the client, for
generating, at the data processing apparatus and sending, to the same client, a first reply to the related second request and then forwarding the first request to the server for the server to write the data for the specified file handle and for the specified user, and for otherwise forwarding the first request to the server without sending any reply to the client for the first request;
wherein the first reply confirms receiving the related second request;
forwarding, at any time with respect to the receiving and the determining, the second request to the server.

16. A machine-implemented method comprising:
at the data processing apparatus, configured separately from a client and a server:
receiving, from the client, a first request directed to the server across a wide area network;
determining whether a related second request directed to the server has been received previously and before the first request was received from the client;
wherein the first request is to write data for a specified file handle on the server and for a specified user, and wherein the related second request is to write data for the specified file handle and for the specified user;
in response to determining that the related second request has been received previously and before the first request was received from the client,
generating, at the data processing apparatus, and sending, to the client, a first reply to the related second request, sending the first reply to the same client and then forwarding the first request to the server for the server to write the data for the specified file handle and for the specified user,
and otherwise forwarding the first request to the server without sending any reply to the client for the first request;
wherein the first reply confirms receiving the related second request;
forwarding, at any time with respect to the receiving and the determining, the second request to the server;
wherein the method is performed by one or more computing devices.

17. The method of claim 16, further comprising sequences of instructions which, when executed by the processor, cause the processor to perform:
receiving, from the server, a second reply to a third request to write data for a second specified file handle and a second specified user;
determining whether the client has been given a second reply to the third request previously;
forwarding the second reply to the client when the client has not been given a second reply to the third request previously, and otherwise discarding the second reply.

18. The method of claim 16, wherein each request and reply conforms to Network File System protocol version 3 (NFSv3) and wherein each request is an NFSv3 request having an UNSTABLE value set.

19. The method of claim 16, wherein the first request is a first fragment of a remote procedure call that conforms to MSRPC, and wherein the second request is a second fragment of the same remote procedure call.

20. A non-transitory machine-readable volatile or non-volatile storage medium storing one or more sequences of instructions which, when executed by one or more processors, cause the processor to perform:
at the data processing apparatus, configured separately from a client computer and a server:
receiving, from the client computer, a first Network File System protocol version 3 (NFSv3) UNSTABLE type asynchronous first request to write a specified file handle for a specified user identifier directed to the server across a wide area network;

determining whether a related second request for the same file handle and user identifier has been received previously and before the first request was received from the client computer;

wherein the first request is to write data for the specified file handle on the server for the specified user identifier, and wherein the related second request is to write data for the specified file handle and for the specified user identifier;

in response to determining that the related second request has been received previously and before the first request was received from the client computer for the same file handle and user identifier, generating, at the data processing apparatus, and sending, to the same client computer, a first reply to the second request and then forwarding the first request to the server for the server to write the data for the specified file handle and for the specified user, and otherwise forwarding the first request to the server without sending any reply to the client for the first request;

wherein the first reply confirms receiving the related second request;

forwarding, at any time with respect to the receiving and the determining, the second request to the server;

receiving, from the server, a second reply to a third request to write a second specified file handle and a second specified user;

determining whether the client has been given the second reply to the third asynchronous write request previously;

when the client has not been given a second reply to the third request previously, forwarding the second reply to the client including any error code of the server that is in the second reply, and otherwise discarding the second reply.

21. A non-transitory machine-readable volatile or non-volatile storage medium storing one or more sequences of instructions which, when executed by one or more processors, cause the processor to perform:

at the data processing apparatus, configured separately from a client computer and a server:

receiving, from the client computer, a first fragment of an MSRPC remote procedure call directed to the server across a wide area network;

determining whether a related second fragment of the same remote procedure call directed to the server has been received previously and before the first fragment was received from the client computer;

wherein the first fragment is to write data for a specified file handle on the server and for a specified user, and where the related second fragment is to write data for the specified file handle and for the specified user;

in response to determining that the related second fragment of the same remote procedure call has been received previously and before the first fragment was received from the client computer, generating, at the data processing apparatus, and sending, to the same client computer, a first reply to the second fragment of the same remote procedure call and then forwarding the first fragment of the same remote procedure call to the server for the server to write the data for the specified file handle and for the specific user, and otherwise forwarding the first fragment of the same remote procedure call to the server without sending any reply to the client for the first fragment of the same remote procedure call;

wherein the first reply confirms receiving the related second fragment;

forwarding, at any time with respect to the receiving and the determining, the second fragment to the server;

receiving, from the server, a second reply to a third fragment of the same remote procedure call;

determining whether the client process has been given the second reply to the fragment of the same remote procedure call previously;

when the client process has not been given a second reply to the third fragment of the same remote procedure call previously, forwarding the second reply to the client process including any error code of the server that is in the second reply, and otherwise discarding the second reply;

receiving from a transport protocol a delivery failure message specifying a failure to deliver one or more of the first fragment and the related second fragment, and sending the delivery failure message to the client process in response to receiving a last fragment from the client process.

* * * * *